(12) United States Patent
Nojiri

(10) Patent No.: US 9,846,401 B2
(45) Date of Patent: Dec. 19, 2017

(54) IMAGE FORMING APPARATUS

(75) Inventor: Akihiko Nojiri, Kawasaki (JP)

(73) Assignee: Canon Finetech Nisca Inc., Misato-shi (JP)

(*) Notice: Subject to any disclaimer, the term of this patent is extended or adjusted under 35 U.S.C. 154(b) by 389 days.

(21) Appl. No.: 12/973,347

(22) Filed: Dec. 20, 2010

(65) Prior Publication Data

US 2011/0161717 A1   Jun. 30, 2011

(30) Foreign Application Priority Data

Dec. 24, 2009 (JP) ................................ 2009-293504
Dec. 14, 2010 (JP) ................................ 2010-278281

(51) Int. Cl.
*G06K 15/16* (2006.01)
*G03G 15/00* (2006.01)
*G06K 15/00* (2006.01)

(52) U.S. Cl.
CPC ..... *G03G 15/6514* (2013.01); *G03G 15/6508* (2013.01); *G06K 15/16* (2013.01); *G06K 15/40* (2013.01); *G03G 2215/00556* (2013.01); *G03G 2215/00599* (2013.01); *G03G 2215/00603* (2013.01)

(58) Field of Classification Search
USPC ................................ 713/400, 500, 501, 502
See application file for complete search history.

(56) References Cited

U.S. PATENT DOCUMENTS 5,059,926 A * 10/1991 Karczewski ................ 331/47
6,535,926 B1 * 3/2003 Esker ........................ 709/248
2003/0041274 A1 * 2/2003 Platteter et al. ............ 713/400
(Continued)

FOREIGN PATENT DOCUMENTS

JP   03-067699 A   3/1991
JP   09-193508     7/1997
(Continued)

OTHER PUBLICATIONS

Japanese Office Action dated Sep. 14, 2012, issued in counterpart Japanese Application No. 2010-278281.
(Continued)

*Primary Examiner* — Zahid Choudhury
(74) *Attorney, Agent, or Firm* — Fitzpatrick, Cella, Harper & Scinto

(57) ABSTRACT

Even in a case where a master-CPU of an image forming section and a slave-CPU of a sheet transportation section are driven by respective oscillation circuits with different oscillation accuracies, a large difference in accuracy is not caused in transfer sheet transportation speed driven by clock signals formed by the respective oscillation circuits. In the master-CPU and the slave-CPU that are cascadingly connected to each other, in order to calculate a clock frequency of an oscillation circuit of the target-CPU, a predetermined time transmitted from the other CPU connected to the target-CPU is counted by the clock signal of the target-CPU. With reference to the predetermined time, an operating process, such as division of an acquired counter value by the predetermined time, acquires an error of the clock frequency of the oscillation circuit driving the slave-CPU, and corrects the error, thereby improving the accuracy thereof.

17 Claims, 16 Drawing Sheets

(56) References Cited

U.S. PATENT DOCUMENTS

| | | | |
|---|---|---|---|
| 2005/0201421 A1* | 9/2005 | Bhandari et al. | 370/519 |
| 2006/0090092 A1* | 4/2006 | Verhulst | 713/400 |
| 2006/0200254 A1* | 9/2006 | Krause | 700/20 |
| 2007/0143641 A1* | 6/2007 | Rhodes | 713/400 |
| 2009/0217074 A1* | 8/2009 | Nichols et al. | 713/401 |

FOREIGN PATENT DOCUMENTS

| | | |
|---|---|---|
| JP | 2006-215869 A | 8/2006 |
| JP | 2006-293138 A | 10/2006 |
| JP | 2009-271569 A | 11/2009 |
| JP | 2010-139792 A | 6/2010 |

OTHER PUBLICATIONS

Japanese Office Action dated May 28, 2013, issued in counterpart Japanese Application No. 2010-278281.
Japanese Office Action dated Sep. 3, 2014, issued in counterpart Japanese Application No. 2013-156913.

* cited by examiner

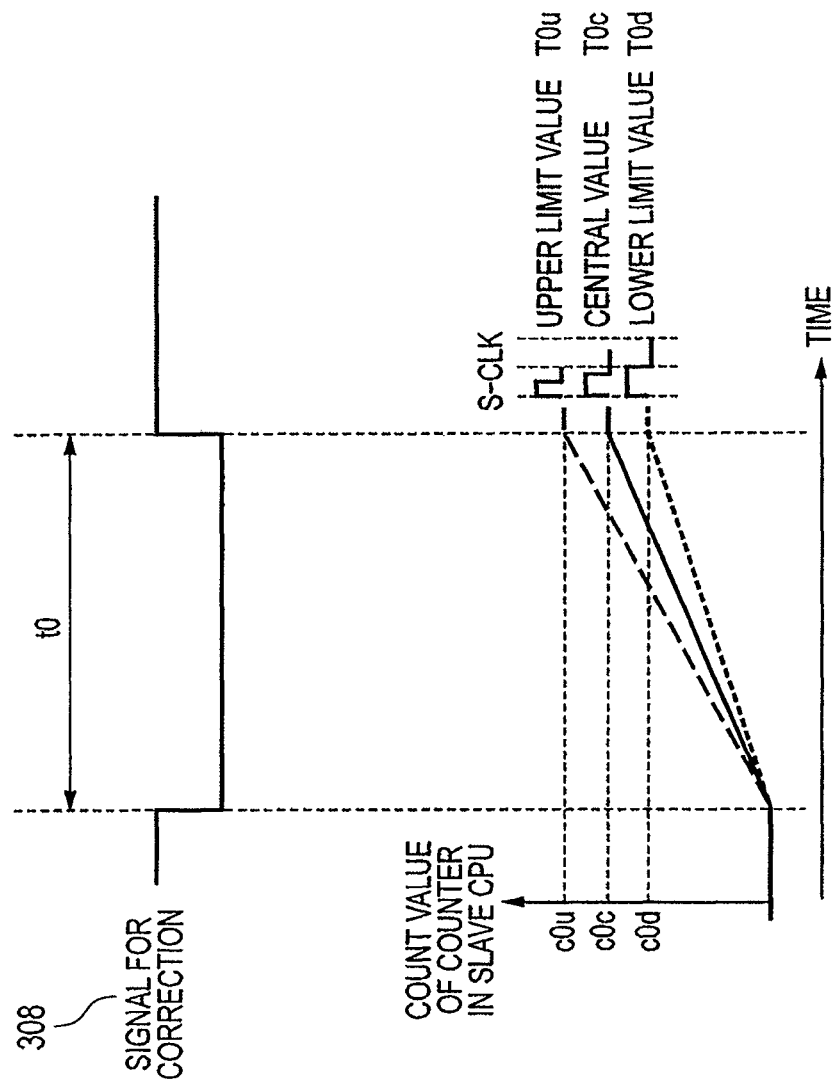

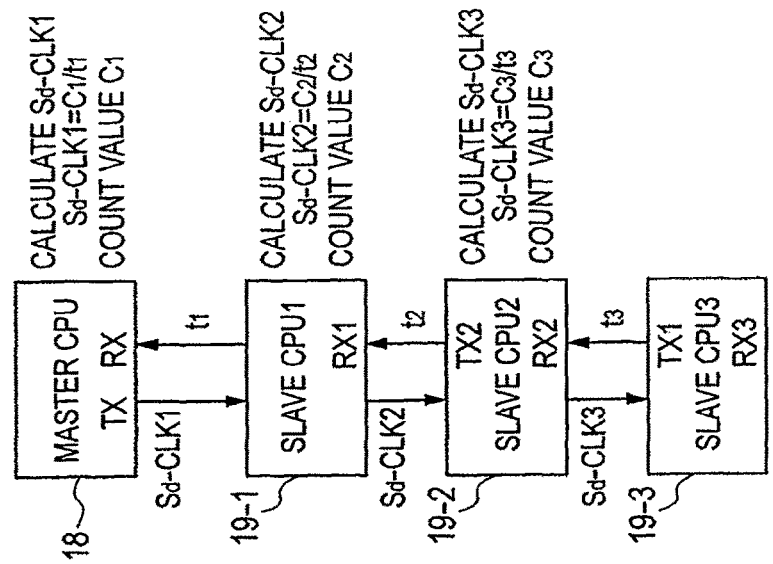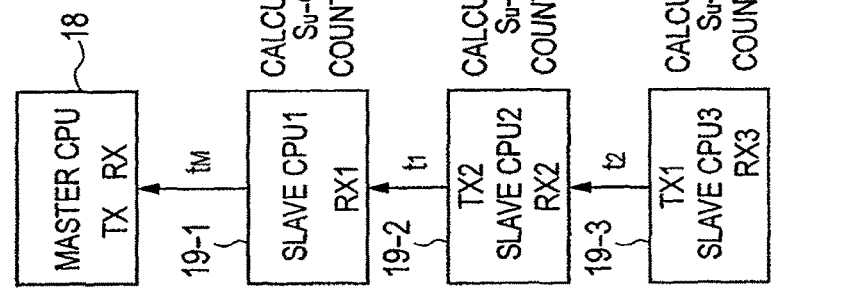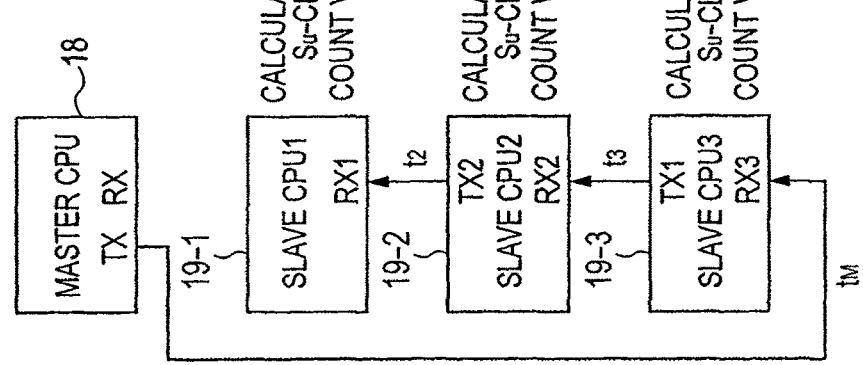

IMAGE FORMING APPARATUS

BACKGROUND OF THE INVENTION

Field of the Invention

The present invention relates to an image forming apparatus. In particular, the present invention relates to an image forming apparatus that includes a master CPU and a slave CPU controlling an operation of a prescribed load based on a data from the master CPU.

Description of the Related Art

Conventionally, among image forming apparatuses, there are laser beam printers that form an image on a transfer material by performing a scan with a laser beam.

FIGS. 15A to 15B are diagrams illustrating schematic configurations of conventional laser beam printers. FIG. 15A illustrates a configuration that connects one optional cassette to an image forming section 2. FIG. 15B illustrates a configuration that connects a plurality of optional cassettes to the image forming section 2.

An image forming apparatus 1, such as a laser beam printer, includes the image forming section 2 that forms an image on a transfer sheet 6 by an electrostatic recording system.

The image forming section 2 receives an on/off signal of a laser beam from an image expanding section (not illustrated), drives the laser beam based on the on/off signal and thereby forms the image on the transfer sheet 6. The image forming section 2 includes a cassette tray 32 for mounting transfer sheets. An internal transfer sheet transportation system (not illustrated) transports the transfer sheet picked up from the cassette tray 32. A motor (not illustrated), which may be a stepping motor, for driving the transfer sheet transportation system is controlled by a master CPU 18.

The image forming section 2 detachably includes an optional cassette 17 including a sheet supply section 16. The optional cassette 17 causes the transfer sheet transportation system (not illustrated) internally included in the sheet supply section 16 to transport the transfer sheet 6 stored in the cassette tray 33 to the image forming section 2, to which the optional cassette 17 is attached. A slave CPU 19 in the sheet supply section 16 causes a communication unit (not illustrated) to receive and transmit an instruction by the master CPU 18, and controls the sheet supply section 16 according to a program stored in a ROM (not illustrated), which may be embedded in the slave CPU 19 or externally equipped. The master CPU 18 controls the image forming section 2. The slave CPU 19 controls the sheet supply section 16.

Conventionally, one of a start-stop synchronization serial communication and a clock-synchronized serial communication is often employed, as a typical communication unit, for transmitting and receiving a data between the master CPU 18 and the slave CPU 19. Hereinafter, description will be made using an example of the clock-synchronized serial communication.

FIG. 16 illustrates a schematic connection diagram for schematically illustrating communication between the master CPU 18 and the slave CPU 19.

A communication unit 20 includes a clock signal line (CLK) 305 transmitting a clock signal output from the master CPU 18, a command signal line (CMD) 306 transmitting a command signal synchronized with the clock signal output from the master CPU 18, and a status signal line (STS) 307 transmitting a status signal output from the slave CPU 19.

The status signal is transmitted in synchronization with the clock signal of the clock signal line (M-CLK) 305. The status signal line (STS) 307 is not limited to one-directional communication from the slave CPU to the master CPU 18, but may be two directional. Further, the status signal line (STS) 307 may transmit the status signal into which an output from a sensor provided at the optional cassette 17 is interleaved.

FIG. 17 illustrates a timing chart of the clock signal (M-CLK signal), the command signal (CMD signal) and the status signal (STS signal).

The master CPU 18 transmits the command signal (CMD signal) synchronized with the clock signal (M-CLK signal) to the slave CPU 19. The slave CPU 19 returns the status signal (STS signal) synchronized with the clock signal (CLK signal) to the master CPU 18. Accordingly, communication between the two CPUs is established.

As illustrated in FIG. 16, the master CPU 18 operates in synchronization with a clock M-CLK21 from a clock circuit 22 for the master CPU. On the other hand, the slave CPU 19 operates in synchronization with a clock S-CLK23 from a clock circuit 24 for the slave CPU.

The clock circuit 22 for the master CPU often employs a quartz oscillator, which is a clock oscillation circuit with high accuracy, in order to control an electrostatic latent image in the image forming section 2 and transportation of a transfer sheet.

When an error occurs in rotation rate of an optional motor (not illustrated) driven by a driving from the slave CPU 19, an error also occurs in transfer sheet transportation speed of the optional cassette 17, as a matter of course. When the error in transfer sheet transportation speed occurs, the transfer sheet transported from the optional cassette 17 is not smoothly passed at a transportation roller of the image forming section 2. Accordingly, the transfer sheet may be torn or contrarily buckled, and cannot be transported. Therefore, an appropriate image forming operation cannot be performed.

Thus, in order to improve accuracy in transfer sheet transportation speed at the optional cassette 17, the clock circuit 24 for the slave CPU often employs a quartz oscillator, which is a clock oscillation circuit with high accuracy.

FIG. 15B illustrates a configuration where optional cassettes 17-1 to 17-3 have a multistage configuration, sheet supply sections 16-1 to 16-3 are configured in a multistage structure and slave CPUs 19-1 to 19-3 are cascadingly connected to a master CPU 18. Here, an example where the sheet supply sections 16-1 to 16-3 employ a three-stage configuration. The configuration is not limited to the three-stage configuration, but may be a configuration whose number of stages is two or more than three.

In this multistage configuration, the master CPU 18 transmits a transmission data 18-1 to the slave CPU 19-3 at the bottom stage. The slave CPU 19-3 picks up a data related to the slave CPU 19-3 from the received transmission data, performs a transporting operation according to a program stored in a ROM (not illustrated) and subsequently transmits a transmission data 18-2 to the slave CPU 19-2 at the directly upper stage.

The slave CPU 19-2 picks up a data related to the slave CPU 19-2 from the transmission data, performs a transporting operation according to a program stored in a ROM (not illustrated) and subsequently transmits a transmission data 18-3 to the slave CPU 19-1 at the directly upper stage.

The slave CPU 19-1 picks up a data related to the slave CPU 19-1 from the received transmission data, performs a transporting operation according to a program stored in a ROM (not illustrated) and subsequently transmits a transmission data 18-4 to the master CPU 18 at the directly upper stage.

In a case where optional units, such as a double-sided transportation unit, an optional cassette unit and an optional envelop unit, are caused to perform an identical operation at the same time, if an option communication unit performs communication operations to the respective optional units in a time series manner and thereby causes the units to perform operations, the operations deviate from each other. In order to address this problem, an image forming apparatus is known that includes a control of separately supplying signals to respective optional units and a control of supplying a common signal to the optional units and changes signal supplying modes according to a state of an engine controller.

The signal supplying mode includes a mode of outputting a prescribed signal to each of the optional units in a time series manner and a mode of concurrently outputting signals specific to the respective optional units to the same units (Japanese Patent Application Laid-Open No. H09-193508).

In recent years, technological innovation in CPU for mechatronics control has remarkably improved. One-chip CPUs embedded with an inexpensive RC oscillator circuit have been provided.

The RC oscillator circuit configured in a semiconductor such as a CPU is inferior in accuracy to a quartz oscillator and a ceramic oscillator. However, control elements that do not require high oscillation accuracy can employ the RC oscillator. This configuration negates the need to externally attach one of an oscillator and an oscillating element to the CPU, thereby providing an advantage that allows a control element to be configured with a simple and inexpensive configuration.

However, in the sheet supply section requiring accuracy in transfer sheet transportation speed, a motor transporting the transfer sheet is driven based on an oscillation period of the oscillator, and the accuracy in transfer sheet transportation speed depends on oscillation accuracy of the oscillator. Therefore, in the image forming apparatus, if the oscillation accuracies of oscillation circuits are different between the image forming section and the sheet supply section provided in the optional cassette, accuracies in transfer sheet transportation speed also differ from each other accordingly. The difference in turn causes a problem in transportation of the transfer sheet. Therefore, the sheet supply section should also employ an oscillator with high oscillation accuracy, as with the image forming section. Accordingly, the advantage acquired by employing the RC oscillator circuit with inferior oscillation accuracy cannot be enjoyed.

Thus, a configuration is required that does not cause difference in accuracy in transfer sheet transportation speed even in a case of employing the RC oscillator circuit with inferior oscillation accuracy as the oscillation circuit for driving the CPU of the sheet supply section in the optional cassette.

SUMMARY OF THE INVENTION

It is an object of the present invention to provide an improved image forming apparatus. Further, it is another object of the present invention to provide an image forming apparatus capable of performing an appropriate image forming operation even in a case with different oscillation accuracies of respective oscillation circuits for driving a master CPU and a slave CPU.

It is still another object of the present invention not to cause a large difference in accuracy in transfer sheet transportation speed even in a case where a plurality of sheet supply sections is connected to an image forming section, a configuration for transporting a fed sheet employs a multi-stage configuration, and slave CPUs controlling the respective sheet supply sections cascadingly is connected in series to a master CPU for controlling an image forming section.

In order to attain the above objects, the present invention includes: a master CPU; and a slave CPU controlling an operation of a prescribed load based on data from the master CPU, wherein the master CPU and the slave CPU include oscillation circuits generating clock signals for references of respective operations thereof, the slave CPU counts a transmission time of prescribed data transmitted from the master CPU based on the clock signal generated by the oscillation circuit included in the slave CPU, and the slave CPU corrects a signal related to the prescribed load according to the counted value.

According to the present invention, in an image forming apparatus, the master CPU and the slave CPU include oscillation circuits generating clock signals for references of respective operations thereof, and the slave CPU counts the transmission time of the prescribed data transmitted from the master CPU based on the clock signal generated by the oscillation circuit included in the slave CPU, and the slave CPU corrects the signal related to the prescribed load according to the counted value, thereby allowing the difference between the oscillation circuits to be reduced.

Further, according to the present invention, the image forming apparatus includes the master CPU of an image forming section performing an image forming control and a sheet transportation, and the slave CPU of a sheet transportation section performing sheet transportation, and a difference in accuracy in transfer sheet transportation speed driven by the clock signals formed in the oscillation circuits can be reduced.

Further, features of the present invention will become apparent from the following description of exemplary embodiments with reference to the attached drawings.

BRIEF DESCRIPTION OF THE DRAWINGS

FIG. 7 is a timing chart for illustrating count operation performed regarding a signal width of a signal for correction as the predetermined time.

FIGS. 10A, 10B and 10C are diagrams for illustrating a first embodiment and the second embodiment of a second aspect of the image forming apparatus of the present invention.

DESCRIPTION OF THE EMBODIMENTS

Preferred embodiments of the present invention will now be described in detail in accordance with the accompanying drawings.

Figure 1:
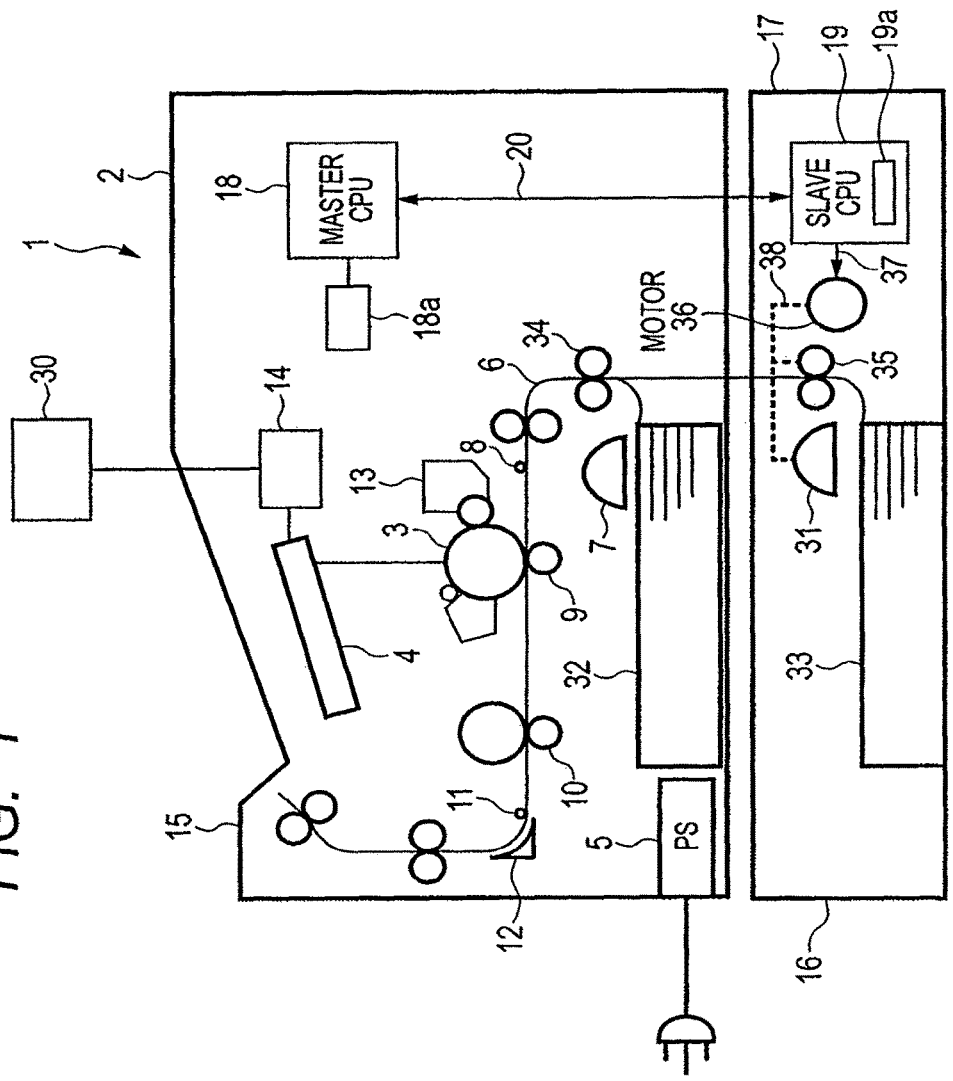
FIG. 1 is a schematic diagram for illustrating a configuration of an image forming apparatus of the present invention.

Exemplary embodiments of the present invention will hereinafter be described in detail using the drawings. A configuration of an image forming apparatus according to the present invention will be described using FIG. 1. FIG. 1 is a schematic diagram for illustrating the configuration of the image forming apparatus of the present invention. FIG. 1 illustrates an example of a laser beam printer. The laser beam printer is an image forming apparatus that performs a scan with a laser beam and, thereby forms an image on transfer material. However, the present invention is not limited to the laser beam. Instead, the present invention may be applied to image forming apparatuses with any configuration that forms an image on a transported sheet.

As illustrated in FIG. 1, the image forming apparatus 1, such as the laser beam printer, includes an image forming section 2 that forms an image on a transfer sheet 6 by an electrostatic recording system, and a sheet supply section 16. The sheet supply section 16 may configure a sheet transportation section together with a finisher (FIN) and an automatic document feeder (ADF). The finisher handles a sheet on which an image is formed. The automatic document feeder handles an original document.

Hereinafter, a sheet transportation section will be described mainly using the sheet supply section.

The image forming section 2 receives an on/off signal of a laser beam from an image expanding section 14, forms an image on a transfer sheet 6 by driving the laser beam based on the on/off signal, and is supplied with electric power by a main power source 5.

The image expanding section 14 is connected to a CPU, which is a host computer 30 provided outside of the image forming apparatus 1, via one of a serial interface and a parallel interface, and expands image information received from the host computer 30 into a bitmap.

In the image forming section 2, a drum-shaped photoreceptor 3, a development device 13 and a fuser device 10 are arranged along a transportation path of the transfer sheet 6. A laser scanner 4 is provided above the photoreceptor 3.

The laser scanner 4, which includes for example a semiconductor laser, a polygon mirror and optical lenses, modulates laser light according to the on/off signal based on the bitmap image information, and scans the photoreceptor 3 with the modulated laser beam. Accordingly, the emitted laser beam forms an electrostatic latent image on the photoreceptor 3. The electrostatic latent image formed on the photoreceptor 3 is developed by the development device 13, and a developer image is formed on the photoreceptor 3.

The transportation path of the transfer sheet 6 is formed by a cassette tray 32, a sheet supply roller 7, a transportation roller 34 and a flapper 12. The transfer sheet 6, having been picked up by the sheet supply roller 7 from the cassette tray 32 and transported by the transportation roller 34, carries the image thereon and is subsequently discharged from a sheet discharge port 15. The sheet supply roller 7 and the transportation roller 34 are driven by a motor (not illustrated) controlled by the master CPU 18.

Further, a resist sensor 8 for detecting that the transfer sheet 6 reaches a prescribed position, and a sheet discharge sensor 11 are provided on the transportation path. The resist sensor 8 is a sensor for detecting that the transfer sheet 6 reaches an input port side of the photoreceptor 3. The sheet discharge sensor 11 is provided on an output port side of the fuser device 10 and detects a paper jam in the fuser device 10.

The resist sensor 8 detects that the transfer sheet 6 reaches the input port side of the photoreceptor 3. When the resist sensor 8 detects the transfer sheet, an image forming process is started.

The developer image formed on the photoreceptor 3 is transferred by a transfer roller 9 onto the transfer sheet 6 transported from the sheet supply roller 7 along the transportation path. The transfer sheet 6, on which the developer image has been transferred, is transported to the fuser device 10.

The fuser device 10 fixes the developer image on the transfer sheet 6 by heating and pressurizing the transfer sheet 6. The transfer sheet 6, on which the image has been fixed, is transported via the flapper 12 to the outside from the sheet discharge port 15. The flapper 12 is a unit for establishing a discharging state, such as one of a face-up discharging and a face-down discharging. The face-up discharging is an operation of discharging a sheet in a state where the image forming surface faces upward. The face-down discharging is an operation of discharging the sheet in a state where the image forming surface faces downward.

The image forming section 2 is controlled by the master CPU 18. The master CPU 18 is embedded or externally equipped with a ROM 18a, and controls an image forming operation of the image forming section 2 and transporting operation of the transfer sheet based on a control program stored in the ROM 18a.

The sheet supply section 16, which is provided in the optional cassette 17, picks up the transfer sheet from the cassette tray 33 and supplies the sheet to the image forming section 2. The sheet supply section 16 stores the transfer sheets, which have a prescribed size, in the cassette tray 33. The transfer sheets stored in the cassette tray 33 are not limited to sheets identical in size to the transfer sheets stored in the cassette tray 32 of the image forming section 2, but may be sheets with any size. The sheet supply section 16 causes a motor 36 to drive an option pick up roller 31 and an optional cassette sheet feeding transportation roller 35 and thereby performs an operation of forwarding the transfer sheet to the image forming section 2. Dotted lines 38 schematically illustrate situations of drive transmission from the motor. A stepping motor is often employed as the motor 36, and controlled by the slave CPU 19.

The slave CPU 19 in the sheet supply section 16 causes the communication unit 20 to receive and transmit an instruction by the master CPU 18. The slave CPU 19 is embedded or externally equipped with a ROM 19a, and controls transporting operation of the transfer sheet of the sheet supply section 16 based on a control program stored in the ROM 19a.

Thus, the master CPU 18 controls the image forming section 2, and the slave CPU 19 controls the sheet supply section 16. The data transmission and reception between the master CPU 18 and the slave CPU 19 is performed by the communication unit 20. The communication is performed according to clock-synchronized serial communication. Instead, the communication may be performed according to one of a start-stop synchronization and a serial communication system analogous thereto.

Figure 2:
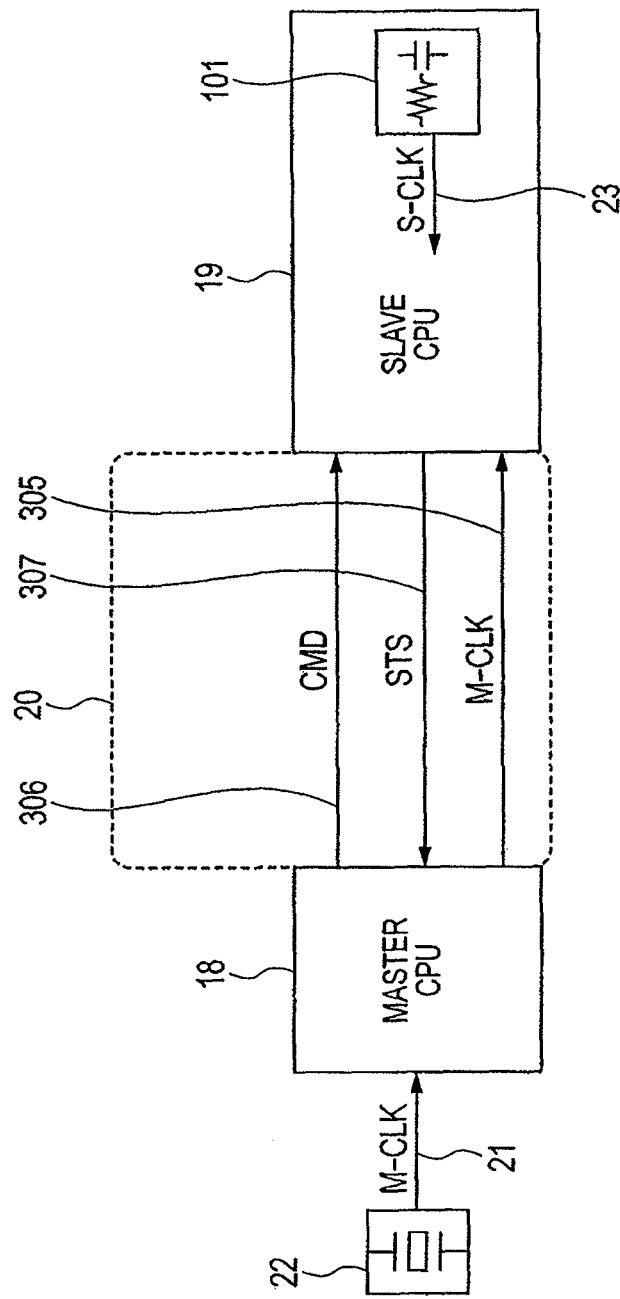
FIG. 2 is a connection diagram for schematically illustrating communication performed between a master CPU and a slave CPU.

FIG. 2 is a connection diagram for schematically illustrating communication performed between the master CPU 18 and the slave CPU 19.

The communication unit 20 includes a clock signal line (M-CLK) 305 transmitting a clock signal output from the master CPU 18, a command signal line (CMD) 306 transmitting a command signal that is synchronized with the clock signal output from the master CPU 18, and a status signal line (STS) 307 transmitting a status signal output from the slave CPU 19.

The status signal is transmitted in synchronization with the clock signal in the clock signal line (M-CLK) 305. The status signal line (STS) 307 in not limited to one-directional communication from the slave CPU to the master CPU 18, but may be two directional. Further, the status signal line (STS) 307 may transmit the status signal into which an output from a sensor provided at the optional cassette 17 is interleaved.

Figure 17:
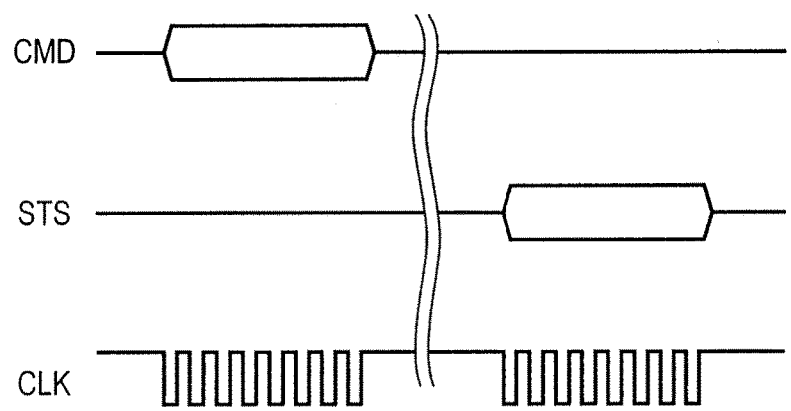
FIG. 17 is a timing chart of a clock signal (CLK signal), a command signal (CMD signal) and a status signal (STS signal).

The signal relationship between the clock signal (M-CLK signal), the command signal (CMD signal) and the status signal (STS signal) is analogous to the relationship in the above timing chart of FIG. 17.

The master CPU 18 transmits the command signal (CMD signal) synchronized with the clock signal (M-CLK signal) to the slave CPU 19. The slave CPU 19 returns the status signal (STS signal) synchronized with the clock signal (M-CLK signal) to the master CPU 18. Accordingly, communication between the two CPUs is established.

As illustrated in FIG. 2, the master CPU 18 operates in synchronization with a clock M-CLK21 from a clock circuit 22 for the master CPU. On the other hand, the slave CPU 19 operates in synchronization with a clock S-CLK23 from a clock circuit 24 for the slave CPU.

The clock circuit 22 for the master CPU often employs a quartz oscillator, which is a clock oscillation circuit with high accuracy, in order to control an electrostatic latent image in the image forming section 2 and transportation of a transfer sheet. On the other hand, according to the configuration of the present invention, the clock circuit 101 for the slave CPU may be an RC oscillator circuit with lower accuracy, and can be internally formed in the slave CPU 19.

The clock circuit 101 for the slave CPU may employ a configuration of being connected to the slave CPU as an external element.

The optional motor 36 of the sheet supply section 16 is driven by a driving signal 37 from the slave CPU 19. The driving signal 37 is formed so as to be synchronized with the clock circuit 101 for the slave CPU. In a case of employing the RC oscillator circuit with lower oscillation accuracy as the clock circuit 101 for the slave CPU, the rotation rate of the optional motor 36 may largely deviate from a predetermined rotation rate. When the rotation rate of the optional motor 36 thus deviates from the predetermined rotation rate, an error occurs between the transportation speed of the transfer sheet transported from the sheet supply section 16 and the transportation speed by the transportation roller 34 of the image forming section 2. Accordingly, the transfer sheet cannot smoothly passed therebetween, may be torn or contrarily buckled. Therefore, the transfer sheet cannot be transported.

Thus, according to a first aspect of the present invention, a predetermined time in communication between the master CPU 18 and the slave CPU is counted and measured by the clock signal of the RC oscillator circuit in the slave CPU 19, and a clock oscillation period (frequency) of the RC oscillator circuit is acquired. The acquired clock oscillation period (frequency) and a predetermined clock oscillation period (frequency) are compared with each other, and thereby acquiring a deviation in clock oscillation period (frequency) of the RC oscillation circuit. A correction value for correcting the rotation rate of the stepping motor and another operation is acquired based on the deviation.

According to the first aspect, the predetermined time may be a time width of a transmission interval between transmission of communication data in the serial communication in a first embodiment; one of a time width of a data transmission time of the communication data itself and a time width during which the communication data is not transmitted in a second embodiment; and a signal for correction in a third embodiment. Implementation may be made according to any one of the embodiments.

Hereinafter, the first embodiment will be described using FIGS. 3 and 4. The second embodiment will be described using FIG. 5. The third embodiment will be described using FIGS. 6 and 7.

Figure 3:
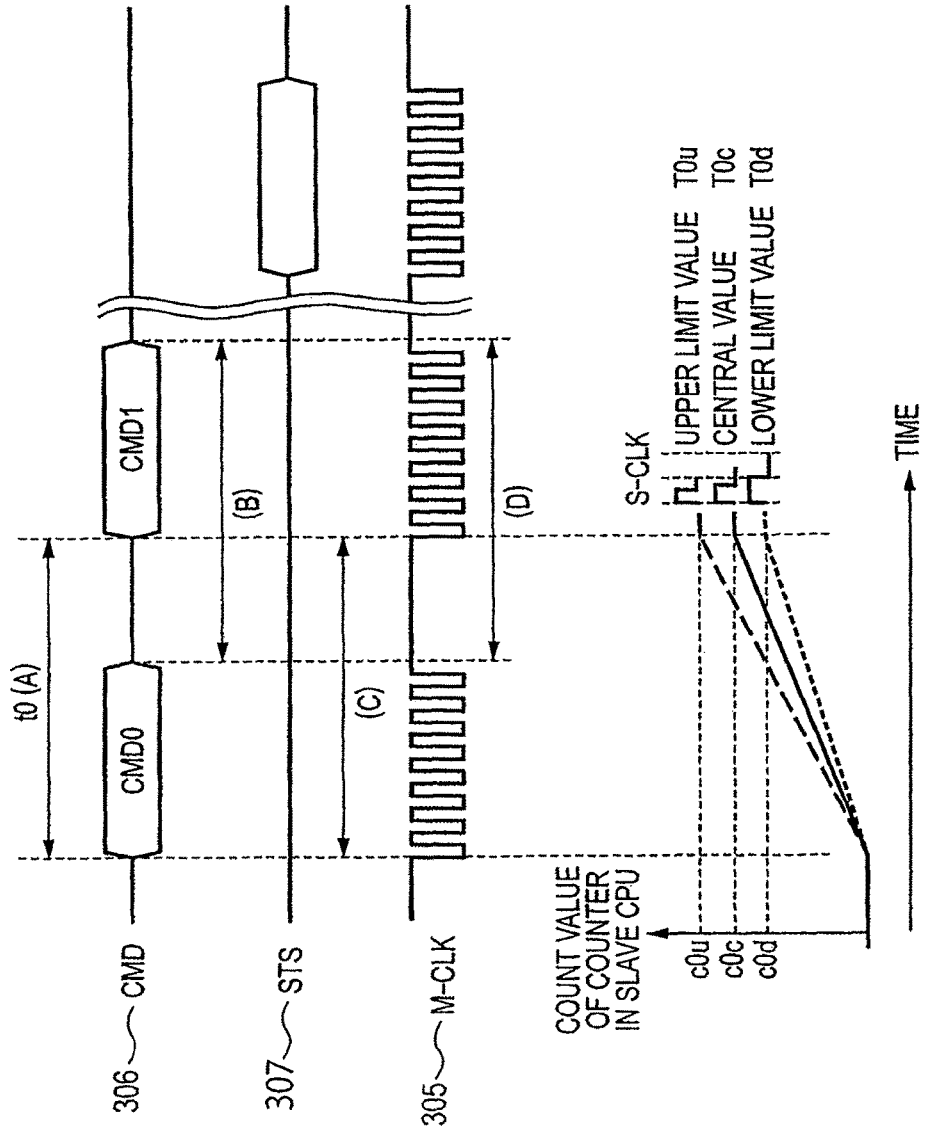
FIG. 3 is a timing chart for illustrating count operation performed regarding a transmission interval as a predetermined time.
Figure 4:
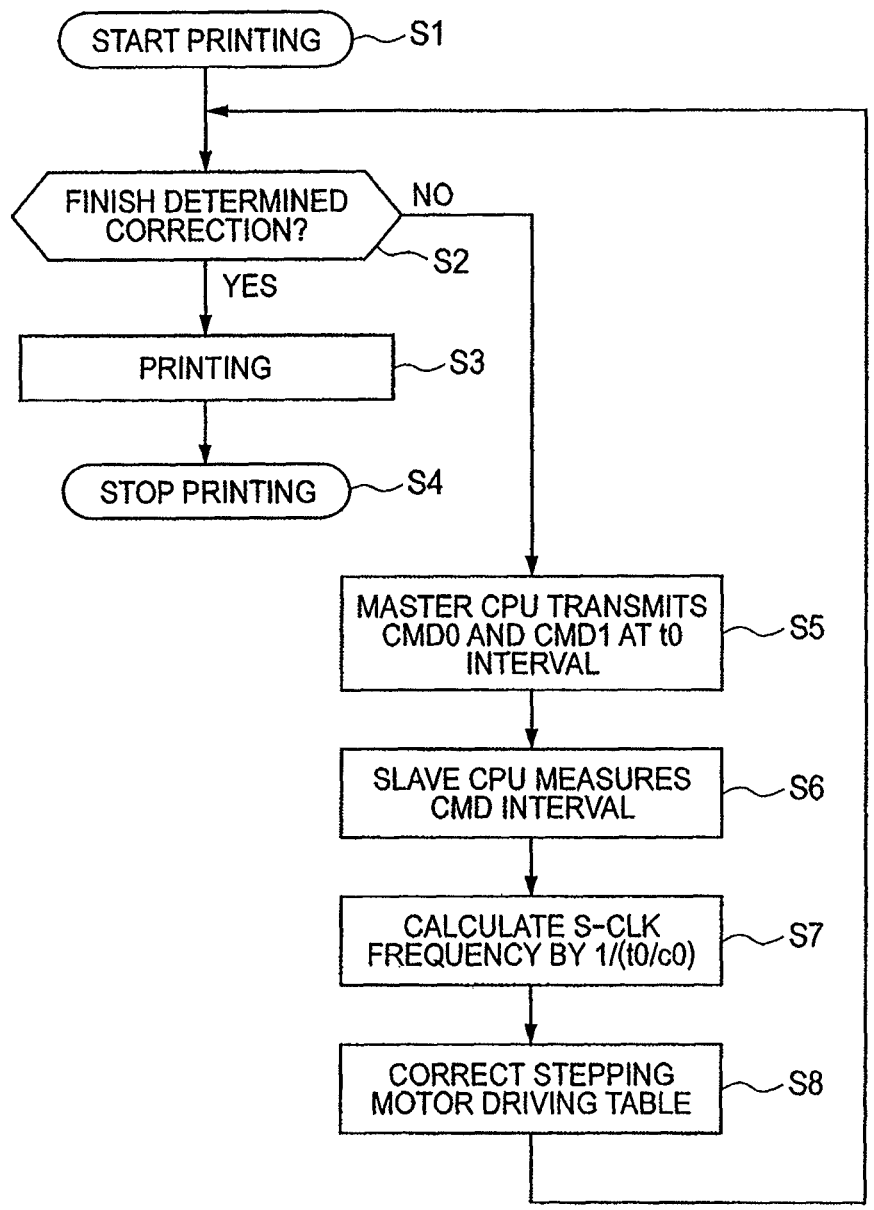
FIG. 4 is a flowchart for illustrating an operation of calculating a clock frequency (period) of the present invention.

First, the first embodiment is described using FIGS. 3 and 4.

The first embodiment employs the time width of the transmission interval between transmission of the communication data as the predetermined time.

The master CPU performs serial communication at a transmission interval of the predetermined time to the slave CPU. The slave CPU counts the transmission interval by the clock signal of the oscillation circuit of the slave CPU. The clock frequency (clock period) of the oscillation circuit of the slave CPU is calculated from a count value of counter acquired by this counting and the predetermined time.

FIG. 3 illustrates a timing chart where the slave CPU performs a count operation regarding the transmission interval t0 as the predetermined time. FIG. 4 illustrates a flowchart in a case where the count operation of the transmission interval is performed by the slave CPU.

FIG. 3 illustrates the command signal line (CMD) 306, the status signal line (STS) 307 and the clock signal line (M-CLK) 305 for the respective signals, as with FIG. 17.

The master CPU 18 transmits a command signal CMD0 and a command signal CMD1 to the slave CPU 19 at a transmission interval t0. Regarding the transmission interval between the command signal CMD0 and the command signal CMD1 transmitted by the master CPU 18, the clock circuit 22 for the master CPU may be, for example, a quartz oscillator, and outputs a clock signal with high accuracy. Because of synchronization with the clock signal M-CLK21, the time width t0 of the transmission interval has high accuracy. Likewise, with respect to the clock signal M-CLK transmitted through the clock signal line (M-CLK) 305, the time width t0 of the transmission interval also has high accuracy.

Further, FIG. 3 illustrates a state where the time width t0 of the transmission interval is counted by the clock signal S-CLK in the slave CPU.

For example, the slave CPU 19 counts time from the head bit of the command signal CMD0 to the head bit of the command signal CMD1 in synchronization with the clock signal S-CLK23 and thereby acquires the count value of counter c0.

Here, the period of the clock signal S-CLK23 of the slave CPU 19 varies within a width between an upper limit value T0$u$ and a lower limit value T0$d$ centered at central value T0$c$. Factors in variation of the clock period include individual differences of elements, variation in temperature and variation in voltage.

In FIG. 3, when the period of S-CLK is the upper limit value T0$u$, a count value of counter c0$u$ is acquired; when the period of S-CLK is the central value T0$c$, a count value of counter c0$c$ is acquired; and when the period of S-CLK is the lower limit value T0$d$, a count value of counter c0$d$ is acquired. Accordingly, the count value of counter c0 varies within the width between the upper limit count value of counter c0$u$ and the lower limit count value of counter c0$d$ centered at c0$c$.

Here, the frequency (period) of the clock signal S-CLK23 can be acquired according to the following Equation (1).

$$\text{S-CLK frequency} = \text{count value of counter } c0/\text{time interval } t0 \qquad (1)$$

The variation is reflected in control of the stepping motor in the sheet supply section and another operation control based on the S-CLK frequency in Equation (1) and the S-CLK period corresponding to the reciprocal of the S-CLK frequency, which is the S-CLK period.

For example, in a stepping motor driving table, which defines a relationship between the rotational operation of the stepping motor and the number of rotations, the value of the number of rotations is changed according to one of the clock frequency and the clock period. Accordingly, correction is made so as to keep the operation rate driven by the stepping motor constant.

This is because, in the stepping motor, the rotation rate depends on the clock frequency and the clock period, and, when the clock frequency and the clock period vary, the rotation rate is varies accordingly even with the identical number of rotations. The present invention changes the number of rotations according to the variation of the clock frequency and the clock period and thereby maintains the rotation rate constant.

The stepping motor driving table defines the number of rotations for various rotational operations. The rotation rate can be maintained constant, by correcting the number of rotations according to one of the clock frequency and the clock period, even in a case where the clock frequency and the clock period vary.

Next, pursuant to the flowchart of FIG. 4, an operation of calculating the clock frequency (clock period) of the slave CPU is described. Here, an example is illustrated where the time width of the transmission interval between transmission of communication data is employed as the predetermined time.

After a printing operation by the image forming apparatus has been started (S1), operations S5 to S8, which will be described below, calculate the clock frequency (period) of the slave CPU (S2) before each printing operation. Here, an example is described of performing the calculation of the clock frequency (period) of the slave CPU for each printing operation. However, the calculating operation is not limited to the case of calculation for each printing operation. Instead, the calculating operation may be performed at a prescribed time interval, including a case of calculation when the power of the image forming apparatus is turned on.

In a unit of a printing job or within a predetermined time, it can be regarded that the clock period of the slave CPU 19 is constant.

In the calculation of the clock frequency (clock period) of the slave CPU in S2, first, the command signal CMD0 and the command signal. CMD1 are transmitted from the master CPU 18 at a predetermined time width t0 of the transmission interval (S5).

The slave CPU 19 counts the time t0 from the head bit of the command signal CMD0 to the head bit of the command signal CMD1 in synchronization with the clock signal S-CLK23 of the slave CPU and thereby acquires the count value of counter c0 (S6). The slave CPU 19 calculates the clock frequency (period) of the slave CPU using the acquired count value of counter c0 based on the following Equation (2).

$$\text{S-CLK frequency} = \text{count value of counter } c0/\text{time interval } t0 \qquad (2)$$

In the above Equation (2), the time interval t0 is formed based on the clock signal of the master CPU. Accordingly, the time interval has high accuracy.

On the other hand, the count value of counter c0 varies dependent on variation in clock frequency of the slave CPU. Therefore, the S-CLK frequency calculated according to Equation (2) represents the clock frequency of the slave CPU (S7).

The stepping motor driving table is corrected based on the S-CLK frequency calculated according to Equation (2). Here, the example of the stepping motor driving table is described. Further, the driving configuration based on the clock frequency of the slave CPU in the sheet supply section 16 may also employ an analogous configuration. A constant operation rate can be maintained irrespective of variation in clock frequency in the slave CPU, by correcting the corresponding drive table (S8).

The operations S5 to S8 complete the calculation of the clock frequency (period) of the slave CPU. After the correction of the driving table is finished (S2), a printing operation is performed (S3) and the printing operation is stopped (S4).

The above example describes the example where the time width of the transmission interval is acquired from the head bit of the command signal CMD0 to the head bit of the command signal CMD1 (an interval illustrated as A in FIG. 3). However, implementation is not limited to this example. Instead, another time width may be employed. For example, a time interval from the end bit of the command signal CMD0 to the end bit of the command signal CMD1 (an interval illustrated as B in FIG. 3) may be employed. A clock signal interval between the clock signal of the command signal CMD0 and the clock signal of the command signal CMD1 (intervals illustrated as C and D in FIG. 3) may be employed.

Figure 5:
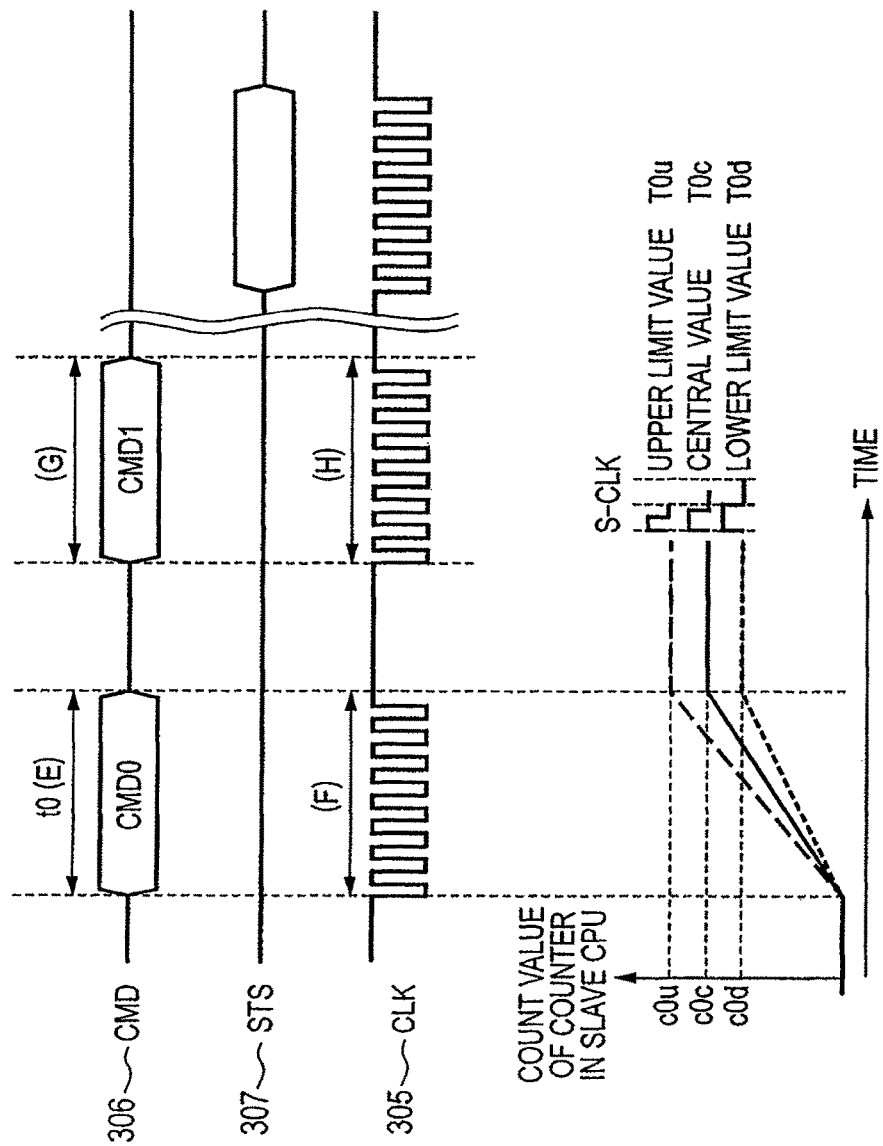
FIG. 5 is a timing chart for illustrating count operation performed regarding a time width of data transmission time as the predetermined time.

Next, the second embodiment is described using FIG. 5. FIG. 5 illustrates a timing chart where the slave CPU performs a count operation regarding the time width t0 of the data transmission time as the predetermined time.

The second embodiment employs the time width of the data transmission time of the communication data itself as the predetermined time.

The master CPU performs serial communication of a communication data for a data transmission time, which is a predetermined time, to the slave CPU. The slave CPU counts the data transmission time of the communication data by the clock signal of the oscillation circuit of the slave CPU. One of the clock frequency and the clock period of oscillation circuit of the slave CPU is calculated from a count value of counter acquired by this counting and the predetermined time.

FIG. 5 illustrates a timing chart where the slave CPU performs a count operation regarding the data transmission time t0 as the predetermined time.

FIG. 5 illustrates the command signal line (CMD) 306, the status signal line (STS) 307 and the clock signal line (M-CLK) 305, as with FIG. 3.

The master CPU 18 transmits the command signal CMD0 to the slave CPU 19 in a data transmission time t0. The time width of the data transmission time of the command signal CMD0 transmitted from the master CPU 18 is synchronized with the clock signal M-CLK21 of the quartz oscillator with high oscillation accuracy. Accordingly, the time width t0 of the data transmission time has high accuracy. With respect to the clock signal M-CLK transmitted in the clock signal line (M-CLK) 305, the time width t0 corresponding to the data transmission time also has high accuracy.

FIG. 5 further illustrates a count operation state where the time width t0 of the data transmission time is counted by the clock signal S-CLK in the slave CPU.

The slave CPU 19 counts the time width t0 of the data transmission time of the command signal CMD0 in synchronization with the clock signal S-CLK23, and acquires the count value of counter c0.

Here, the period of the clock signal S-CLK23 of the slave CPU 19 varies within a width between an upper limit value T0$u$ and a lower limit value T0$d$ centered at a central value T0$c$. Factors in variation of the clock signal include individual differences of elements, variation in temperature and variation in voltage.

In FIG. 5, when the period of S-CLK is the upper limit value T0$u$, a count value of counter c0$u$ is acquired; when the period of S-CLK is the central value T0$c$, a count value of counter c0$c$ is acquired; and when the period of S-CLK is the lower limit value T0$d$, the count value of counter c0$d$ is acquired. Accordingly, the count value of counter c0 varies within the width between the upper limit count value of counter c0$u$ and the lower limit count value of counter c0$d$ centered at c0$c$.

Here, the frequency (period) of the clock signal S-CLK23 can be acquired according to Equation (3) as with the first embodiment.

$$\text{S-CLK frequency} = \text{count value of counter } c0/\text{time interval } t0 \quad (3)$$

The variation is reflected in control of the stepping motor in the sheet supply section and another operation control based on the S-CLK frequency in Equation (3) and the S-CLK period corresponding to the reciprocal of the S-CLK frequency, which is the S-CLK period.

The above example describes the case of acquiring the time width of the data transmission time from the time width of the data transmission time of the command signal CMD0 (an interval illustrated as E in FIG. 5). However, the acquisition is not limited to this example. Instead, another time width may be employed. For example, the time width of the clock signal M-CLK corresponding to the command signal CMD0 (an interval illustrated as F in FIG. 5) may be employed. Instead, the command signal CMD1 may be employed (intervals illustrated as G and H in FIG. 5). Note that the time width of the data transmission time of the command signal CMD1 may be different from the time width of the data transmission time of the command signal CMD0. In this case, the time interval t0 used for calculating the S-CLK frequency may be the time width of the data transmission time of the command signal CMD1.

Figure 6:
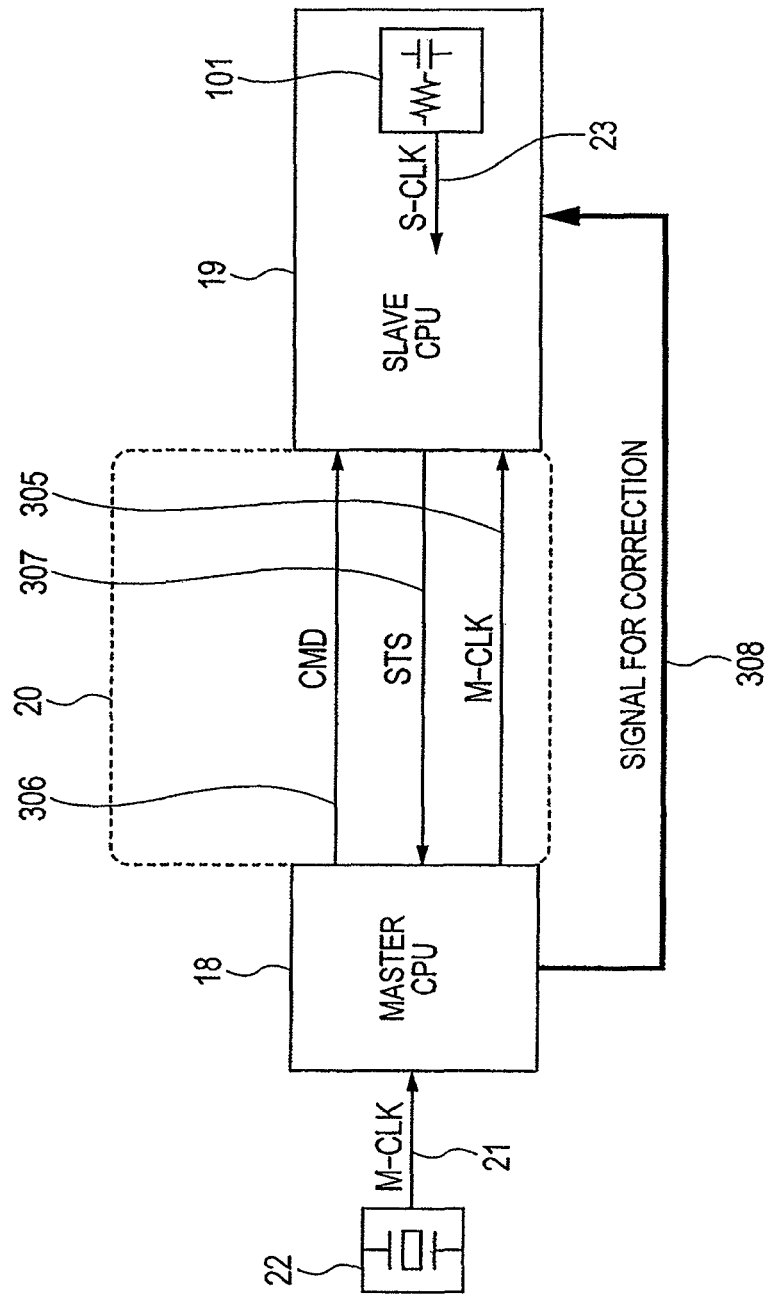
FIG. 6 is a connection diagram for schematically illustrating communication between the master CPU and the slave CPU.

Next, the third embodiment is described using FIGS. 6 and 7.

The third embodiment employs a signal for correction as a predetermined time. Here, an implementation using the signal for correction whose signal length is predetermined as a communication data is illustrated.

The master CPU outputs the signal for correction to the slave CPU. The slave CPU counts the signal length of the signal for correction by the clock signal of the oscillation circuit of the slave CPU. One of the clock frequency and the clock period of the oscillation circuit of the slave CPU is calculated from a count value of counter acquired by this counting and the predetermined time.

FIG. 6 is a connection diagram for schematically illustrating communication between the master CPU 18 and slave CPU 19, as with FIG. 2.

The communication unit 20 includes a clock signal line (M-CLK) 305 transmitting a clock signal output from the master CPU 18, a command signal line (CMD) 306 transmitting a command signal synchronized with the clock signal output from the master CPU 18, and a status signal line (STS) 307 transmitting a status signal output from the slave CPU 19.

The status signal is transmitted in synchronization with the clock signal in the clock signal line (M-CLK) 305. The status signal line (STS) 307 in not limited to one-directional communication from the slave CPU to the master CPU 18, but may be two directional. Further, the status signal line (STS) 307 may transmit the status signal into which an output from a sensor provided at the optional cassette 17 is interleaved.

The signal relationship between the clock signal (M-CLK signal), the command signal (CMD signal) and the status signal (STS signal) is analogous to the relationship in the above timing chart of FIG. 17.

The master CPU 18 transmits the command signal (CMD signal) synchronized with the clock signal (M-CLK signal) to the slave CPU 19. The slave CPU 19 returns the status signal (STS signal) synchronized with the clock signal (M-CLK signal) to the master CPU 18. Accordingly, communication between the two CPUs is established. The master CPU 18 also transmits a signal for correction 308 to the slave CPU 19.

As illustrated in FIG. 6, the master CPU 18 operates in synchronization with a clock M-CLK21 from a clock circuit 22 for the master CPU. On the other hand, the slave CPU 19 operates in synchronization with a clock S-CLK23 from a clock circuit 24 for the slave CPU.

FIG. 7 illustrates a timing chart where the slave CPU performs a count operation regarding the signal width t0 of the signal for correction as the predetermined time.

FIG. 7 illustrates the signal for correction 308, and a count operation state where the signal width t0 of the signal for correction is counted by the clock signal S-CLK in the slave CPU. Here, the clock signal M-CLK, the command signal CMD0 and the status signal STS are omitted.

The signal width of the signal for correction transmitted from the master CPU 18 is synchronized with the clock signal M-CLK21 of the quartz oscillator with high oscillation accuracy. Accordingly, the signal width t0 of the signal for correction also has high accuracy.

The slave CPU 19 counts the signal width t0 of the signal for correction in synchronization with the clock signal S-CLK23 and thereby acquires the count value of counter c0.

Here, the period of the clock signal S-CLK23 of the slave CPU 19 varies within a width between an upper limit value T0$u$ and a lower limit value T0$d$ centered at a central value T0$c$. Factors in variation of the clock signal include individual differences of elements, variation in temperature and variation in voltage.

In FIG. 7, when the period of S-CLK is the upper limit value T0$u$, a count value of counter c0$u$ is acquired; when the period of S-CLK is the central value T0$c$, a count value of counter c0$c$ is acquired; and when the period of S-CLK is the lower limit value T0$d$, the count value of counter c0$d$ is acquired. Accordingly, the count value of counter c0 varies within the width between the upper limit count value of counter c0$u$ and the lower limit count value of counter c0$d$ centered at c0$c$.

Here, the frequency (period) of the clock signal S-CLK23 is acquired according to Equation (4), as with the first and second embodiments $$\text{S-CLK frequency} = \text{count value of counter } c0/\text{time interval } t0 \qquad (4)$$

The variation is reflected in control of the stepping motor in the sheet supply section and another operation control based on the S-CLK frequency in Equation (4) and the S-CLK period corresponding to the reciprocal of the S-CLK frequency, which is the S-CLK period.

In FIG. 7, the interval where the signal for correction is low is employed as the signal width. Instead, the interval where the signal for correction is high may be employed as the signal width.

Figure 8A:
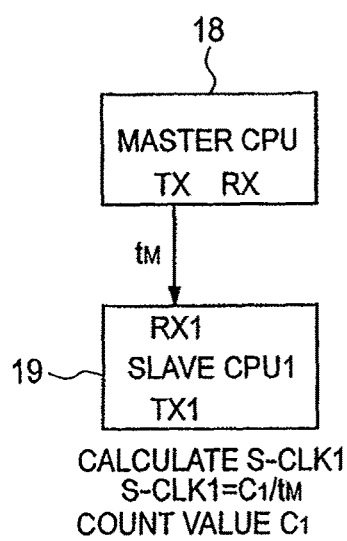
FIGS. 8A and 8B are diagrams for schematically illustrating a first aspect of the present invention.
Figure 8B:
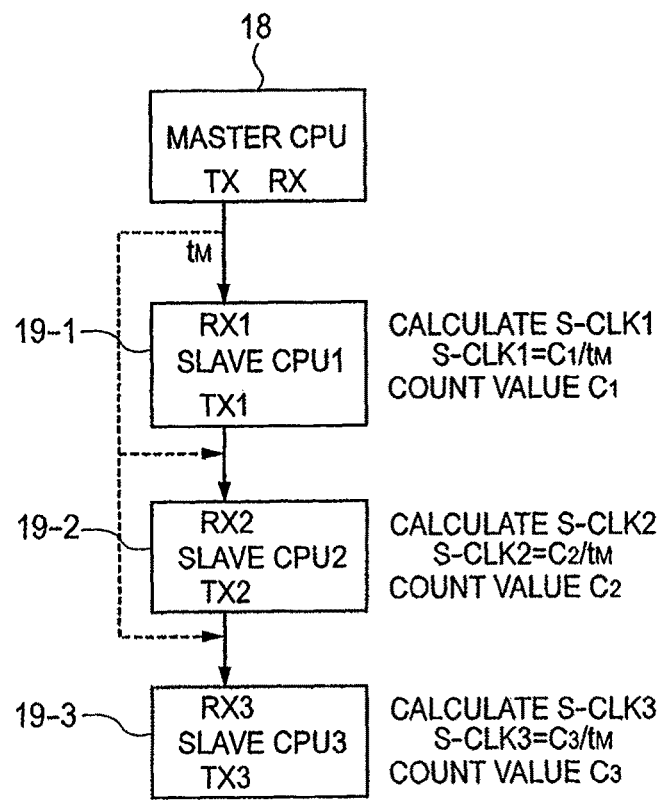

FIGS. 8A and 8B are diagrams for schematically illustrating the first aspect of the present invention.

FIG. 8A illustrates an example of a configuration where one slave CPU is connected to the master CPU. FIG. 8B illustrates an example of a configuration where plurality of slave CPUs is cascadingly connected to the master CPU.

In the example of the configuration illustrated in FIG. 8A, the slave CPU 1 (19) receives information of a predetermined time tM from the master CPU 18, counts the predetermined time tM by the clock signal in the slave CPU (19), and acquires a count value of counter c1. Accordingly, the clock frequency S-CLK1 in the slave CPU 1 (19) can be calculated by an operation of S-CLK1=c1/tM.

In the example of the configuration of the cascading connection illustrated in FIG. 8B, slave CPUs 1 to 3 (19-1 to 19-3) receive a data of predetermined time tM from the master CPU 18, count the predetermined time tM by respective clock signals in the slave CPUs 1 to 3(19-1 to 19-3), and acquire count values of counters c1 to c3. Accordingly, the clock frequency S-CLK1 in the slave CPU 1(19-1) can be calculated by the operation of S-CLK1=c1/tM. The clock frequency S-CLK2 in the slave CPU 2 (19-2) can be calculated by an operation of S-CLK2=c2/tM. The clock frequency S-CLK3 of the slave CPU 3(19-3) can be calculated by an operation of S-CLK3=c3/tM.

A data of predetermined time tM may be output from the master CPU 18 to each of the cascadingly connected slave CPUs 1 to 3 (19-1 to 19-3) by sequentially outputting the data between the slave CPUs 1 to 3(19-1 to 19-3). Instead, the data may be output by separate transmission from the master CPU 18 to each of the slave CPUs 1 to 3(19-1 to 19-3), as illustrated by broken lines in FIG. 8B.

In a case of sequentially transmitting the data between each of the slave CPUs 1 to 3 (19-1 to 19-3), for example, a data including a data to be separately transmitted to each slave CPU and a data of the predetermined time tM is transmitted from the master CPU, each slave CPU acquires the separate data and the data of the predetermined time tM, and a data for another slave CPU and the data of the predetermined time tM are transmitted to the next slave CPU. The transmission can thus be performed.

Next, a second aspect of the present invention is described using FIG. 9 to FIG. 14.

The second aspect of the image forming apparatus of the present invention forms the predetermined time based on the clock frequency (period) of the oscillation circuit of the slave CPU provided in the sheet supply section. As with the first aspect, the image forming apparatus includes an image forming section having a master CPU that performs an image forming control and a sheet feeding and transporting operation, and the sheet supply section having a slave CPU that performs the sheet feeding and transporting operation.

The master CPU and the slave CPU separately include respective oscillation circuits. Transmission and reception of a communication data between the master CPU and the slave CPU are performed according to serial communication for a predetermined time.

Figure 9:
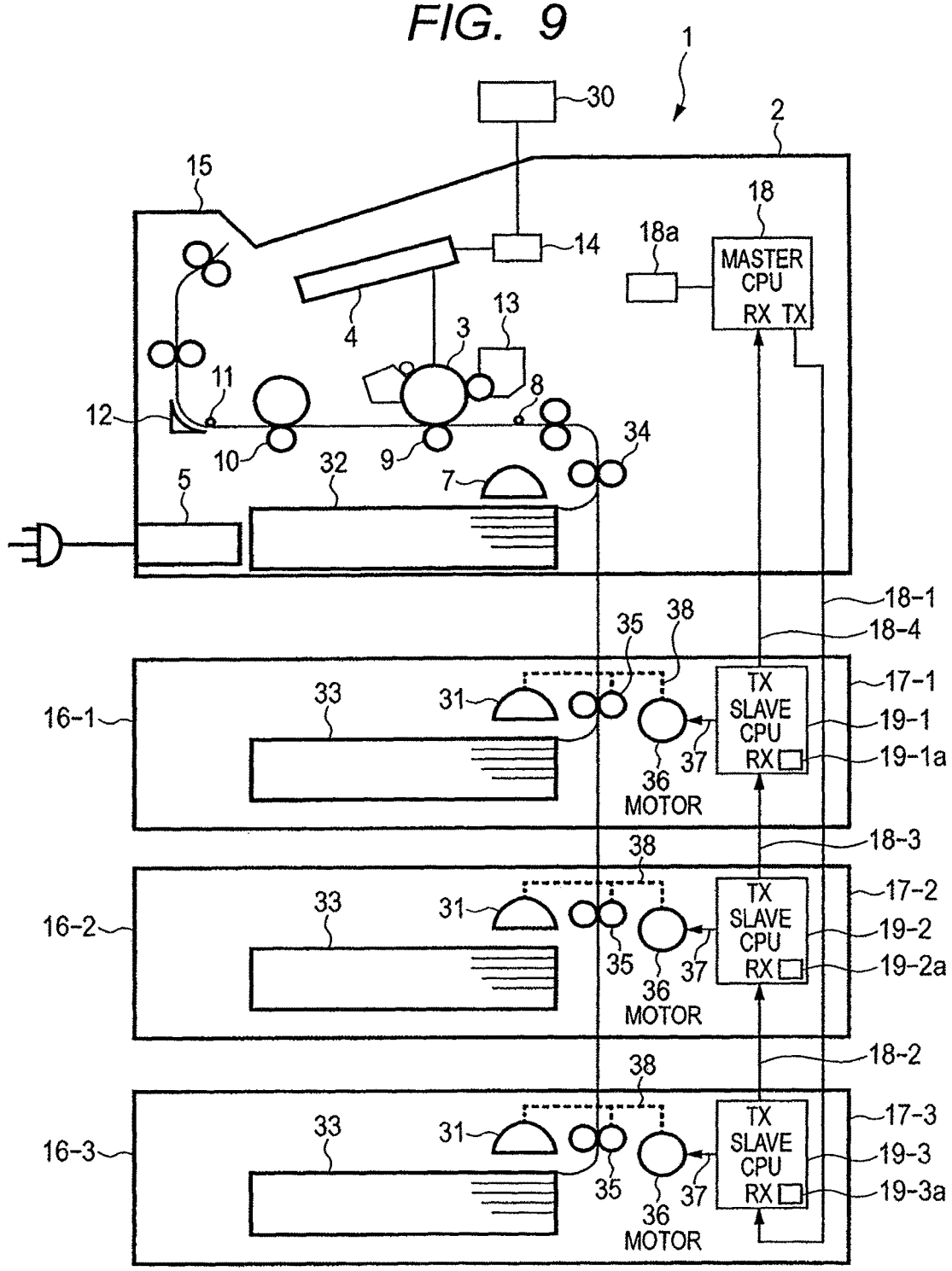
FIG. 9 is a diagram for illustrating an example of a configuration of a second aspect of the image forming apparatus of the present invention.

First, an example of a configuration of the second aspect of the image forming apparatus of the present invention is described using FIG. 9.

In FIG. 9, the example of the configuration of the second aspect of the image forming apparatus of the present invention employs a laser beam printer. In the image forming apparatus described in FIG. 1, a plurality of optional cassettes 17-1 to 17-3 is connected to an image forming section 2 in series. The optional cassettes 17-1 to 17-3 include sheet supply sections 16-1 to 16-3, respectively, and transport the transfer sheet to the image forming section 2.

The sheet supply sections 16-1 to 16-3 include slave CPUs 19-1 to 19-3 and are controlled according to programs stored in embedded ROMs 19-1$a$ to 19-3$a$, respectively. The slave CPUs 19-1 to 19-3 and the master CPU 18 are cascadingly connected to each other. A transmission data 18-1 is transmitted from the master CPU to the slave CPU 19-3. A transmission data 18-2 is transmitted from the slave CPU 19-3 to the slave CPU 19-2. A transmission data 18-3 is transmitted from the slave CPU 19-2 to the slave CPU 19-1. The configurations of the sheet supply sections 16-1 to 16-3 are identical to the respective sheet supply sections 16, having been described above. Accordingly, description thereof is omitted.

Here, the example is described where the optional cassettes and the sheet supply sections are stacked in a three-stage configuration. A configuration whose number of stages is two or more than three may be employed.

The second aspect includes first and second embodiments. The first embodiment counts and measures the predetermined time based on the clock frequency (period) of the oscillation circuit of the slave CPU provided in the sheet supply section, which is the predetermined time acquired from the upstream CPU, by the clock frequency (period) of the downstream CPU. The second embodiment counts and measures the predetermined time acquired from the downstream CPU by the clock frequency (period) of the upstream CPU. Further, a third embodiment can be implemented in this aspect. The third embodiment calculates the clock frequency (period) by assigning weights to the two clock frequencies (periods) acquired in the first and second embodiments and adding the weighted frequencies to each other.

Figure 11:
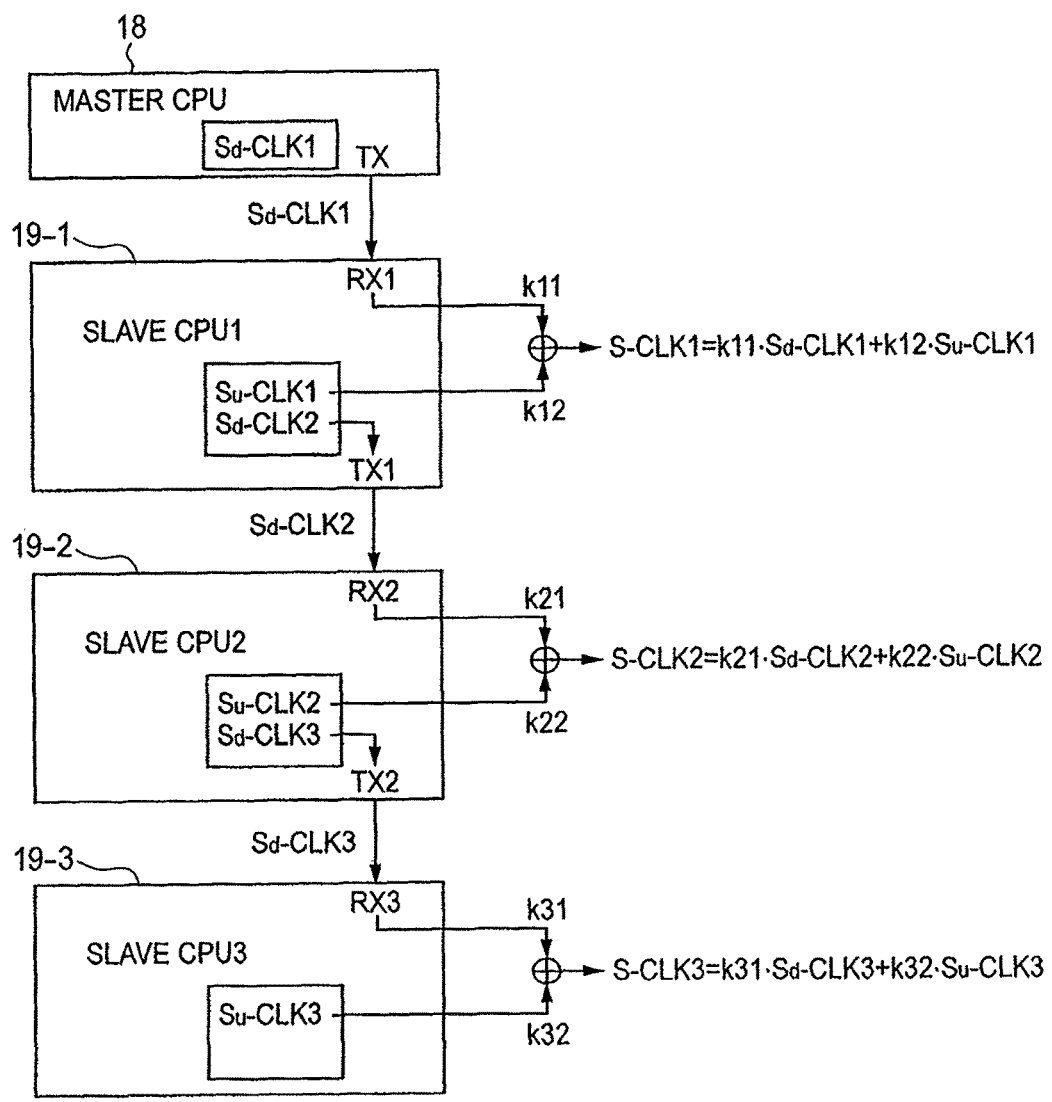
FIG. 11 is a diagram for illustrating a third embodiment of the second aspect of the image forming apparatus of the present invention.

FIGS. 10A to 10C are diagram for illustrating the first and second embodiments of the second aspect. FIG. 11 is a diagram for illustrating the third embodiment of the second aspect.

First, the first embodiment is described. In the first embodiment, an image forming section 2 and plural stages of sheet supply sections 16 are serially connectable to each other. The sheet supply sections 16 (16-1 to 16-3) include slave CPUs 19 (19-1 to 19-3). A master CPU 18 of the image forming section 2 and the slave CPUs 19 (19-1 to 19-3) are cascadingly connected to each other. In this cascade connection, serial communication is performed regarding the master CPU 18 as an upstream side.

In an operation of counting the predetermined time, the downstream slave CPUs 19 (19-1 to 19-3) acquires the predetermined time based on the data length of a communication data from one of the upstream master CPU 18 and slave CPU 19 connected to the downstream slave CPU 19 (19-1 to 19-3) and/or a time interval between communication data. The acquired predetermined time is counted by the clock signal of the oscillation circuit of the downstream slave CPU 19. The clock frequency (period) of the oscillation circuit of the slave CPU 19 is calculated from the predetermined time and a count value of counter acquired by counting.

FIGS. 10A and 10B are diagrams for illustrating the first embodiment. In the example illustrated in FIG. 10A, the master CPU 18 transmits a communication data including information of a predetermined time tM to the slave CPU 19-3 among the slave CPUs 19-1 to 19-3, which are cascadingly connected to each other.

The slave CPU 19-3 counts the predetermined time tM acquired from the master CPU 18 by the clock frequency of the slave CPU 19-3, and divides an acquired count value of counter cM by the predetermined time tM, thereby acquiring the clock frequency of the slave CPU 19-3, Su-CLK3=cM/tM. The slave CPU 19-3 forms a predetermined time t3 based on the acquired clock frequency Su-CLK3, and transmits the predetermined time t3 to the slave CPU 19-2.

Next, the slave CPU 19-2 counts the predetermined time t3 acquired from the slave CPU 19-3 by the clock frequency included in the slave CPU 19-2, and acquires the clock frequency Su-CLK2=c3/t3 of the slave CPU 19-2 by dividing the acquired count value of counter c3 by the predetermined time t3.

Next, the slave CPU 19-1 counts a predetermined time t2 acquired from the slave CPU 19-2 by the clock frequency included in the slave CPU 19-1, and acquires the clock frequency Su-CLK1=c2/t2 of the slave CPU 19-1 by dividing the acquired count value of counter c2 by the predetermined time t2.

In the example illustrated in FIG. 10B, the master CPU 18 transmits a communication data including the predetermined time tM to the slave CPU 19-1 among the slave CPUs 19-1 to 19-3, which are cascadingly connected to each other.

The slave CPU 19-1 counts the predetermined time tM acquired from the master CPU 18 by the clock frequency of the slave CPU 19-1, and divides the acquired count value of counter cM by the predetermined time tM, thereby acquiring the clock frequency Su-CLK1=cM/tM of the slave CPU 19-1. The slave CPU 19-1 forms a predetermined time t1 based on the acquired clock frequency Su-CLK1, and transmits the predetermined time t1 to the slave CPU 19-2.

Next, the slave CPU 19-2 counts the predetermined time t1 acquired from the slave CPU 19-1 by the clock frequency of the slave CPU 19-2, and divides the acquired count value of counter c1 by the predetermined time t1, thereby acquiring the clock frequency Su-CLK2=c1/t1 of the slave CPU 19-2.

Next, the slave CPU 19-3 counts the predetermined time t2 acquired from the slave CPU 19-2 by the clock frequency of the slave CPU 19-3, and divides the acquired count value of counter c2 by the predetermined time t2, thereby acquiring the clock frequency Su-CLK3=c2/t2 of the slave CPU 19-3.

Next, the second embodiment is described. In the second embodiment, an image forming section and plural stages of sheet supply sections are serially connectable to each other. The sheet supply sections include respective slave CPUs. A master CPU and the slave CPUs are cascadingly connected to each other. In this cascade connection, serial communication is performed regarding the master CPU 18 as an upstream side.

In an operation of counting the predetermined time, one of the upstream slave CPU and the master CPU acquires the predetermined time based on the data length of a communication data from the downstream master CPU connected to the upstream slave CPU and/or a time interval between communication data. The acquired predetermined time is counted by one of the clock signal of the oscillation circuit of the upstream slave CPU and the clock signal of the oscillation circuit of the master CPU. The clock frequency (period) of the oscillation circuit of the slave CPU is calculated from the predetermined time and a count value of counter acquired by counting.

In the example illustrated in FIG. 10C, the slave CPU 19-1 forms a predetermined time t1 based on the clock frequency (period) of the slave CPU 19-1, and transmits the predetermined time t1 to the master CPU 18.

The master CPU 18 counts the predetermined time t1 transmitted from the slave CPU 19-1 by the clock frequency of the master CPU 18, and divides an acquired count value of counter c1 by the predetermined time t1, thereby acquiring the clock frequency Sd-CLK1=c1/t1 of the slave CPU 19-1. The master CPU 18 transmits the acquired clock frequency Sd-CLK1 to the slave CPU 19-1.

Next the slave CPU 19-2 forms a predetermined time t2 based on the clock frequency (period) of the slave CPU 19-2, and transmits the predetermined time t2 to the slave CPU 19-1. The slave CPU 19-1 counts the predetermined time t2 transmitted from the slave CPU 19-2 by the clock frequency Sd-CLK1 transmitted from the master CPU 18, divides the acquired count value of counter c2 by the predetermined time t2, thereby acquiring the clock frequency Sd-CLK2=c2/t2 of the slave CPU 19-2. The slave CPU 19-2 transmits the acquired clock frequency Sd-CLK2 to the slave CPU 19-3.

Next, the slave CPU 19-3 forms a predetermined time t3 based on the clock frequency (period) of the slave CPU 19-3, and transmits the predetermined time t3 to the slave CPU 19-2. The slave CPU 19-2 counts the predetermined time t3 transmitted from the slave CPU 19-3 by the clock frequency Sd-CLK2 transmitted from the slave CPU 19-1, divides the acquired count value of counter c3 by the predetermined time t3, thereby acquiring the clock frequency Sd-CLK3=c3/t3 of the slave CPU 19-3.

In the third embodiment, an image forming section and plural stages of sheet supply sections are serially connectable to each other. The sheet supply sections include respective slave CPUs. A master CPU 18 and the slave CPUs are cascadingly connected to each other. In this cascade connection, serial communication is performed regarding the master CPU 18 as an upstream side.

As described in the first embodiment, in an operation of counting the predetermined time, the downstream slave CPUs acquire the predetermined time based on a the data length of a communication data from one of the upstream master CPU and slave CPU connected to the downstream slave CPU and/or a time interval between communication data. The acquired predetermined time is counted by the clock signal of the oscillation circuit of the downstream slave CPU. The clock frequency (period) of the oscillation circuit of the slave CPU is calculated from the predetermined time and a count value of counter acquired by counting as a first clock frequency (period).

On the other hand, as described in the second embodiment, in an operation of counting the predetermined time, the upstream slave CPU acquires the predetermined time based on the data length of a communication data from the downstream master CPU connected to the upstream slave CPU and/or a time interval between communication data. The acquired predetermined time is counted by the clock signal of the oscillation circuit of the upstream slave CPU. The clock frequency (period) of the oscillation circuit of the slave CPU is calculated, from the predetermined time and a count value of counter acquired by the counting as a second clock frequency (period).

The third embodiment assigns weights to the first clock frequency (period) calculated in the first embodiment and the second clock frequency (period) calculated in the second embodiment and adds the weighted clock frequencies to each other, thereby calculating the clock frequency (period) of the slave CPU. The weights can be determined according to accuracy of the predetermined time used for calculating the respective clock frequencies (periods). For example, the higher the accuracy of the predetermined time used for calculating the clock frequency (period) is, the larger weight is assigned thereto.

FIG. 11 illustrates a process of assigning weights after the first and second frequencies (periods) are acquired by the processes of calculating the clock frequencies (periods) in the first and second embodiments and stored in the CPU.

For example, the master CPU 18 stores the clock frequency Sd-CLK1 calculated in the second embodiment. The slave CPU 19-1 stores the clock frequency Su-CLK1 calculated in the first embodiment and the clock frequency Sd-CLK2 calculated in the second embodiment. The slave CPU 19-2 stores the clock frequency Su-CLK2 calculated in the first embodiment and the clock frequency Sd-CLK3 calculated in the second embodiment. The slave CPU 19-3 stores the clock frequency Su-CLK3 calculated in the first embodiment.

Here, the slave CPU 19-1 multiplies the clock frequency Sd-CLK1 by a coefficient k11, as a weight, and multiplies the clock frequency Su-CLK1 by a coefficient k12, as a weight, and adds the multiplied values to each other, thereby calculating a weighted clock frequency Su-CLK1.

The slave CPU 19-2 multiplies the clock frequency Sd-CLK2 by a coefficient k21, as a weight, and multiplies the clock frequency Su-CLK2 by a coefficient k22, as weight, and adds the multiplied values to each other, thereby calculating a weighted clock frequency Su-CLK2.

The slave CPU 19-3 multiplies the clock frequency Sd-CLK3 by a coefficient k31, as a weight, and multiplies the clock frequency Su-CLK3 by a coefficient k32, as a weight, and adds the multiplied values to each other, thereby calculating a weighted clock frequency Su-CLK3.

The weight coefficients k11 to k32 may arbitrarily be set according to degrees of accuracy of the clock frequencies to be added.

An example of an operation of the second aspect of the image forming apparatus of the present invention will hereinafter be described using FIGS. 12 to 14.

Figure 12:
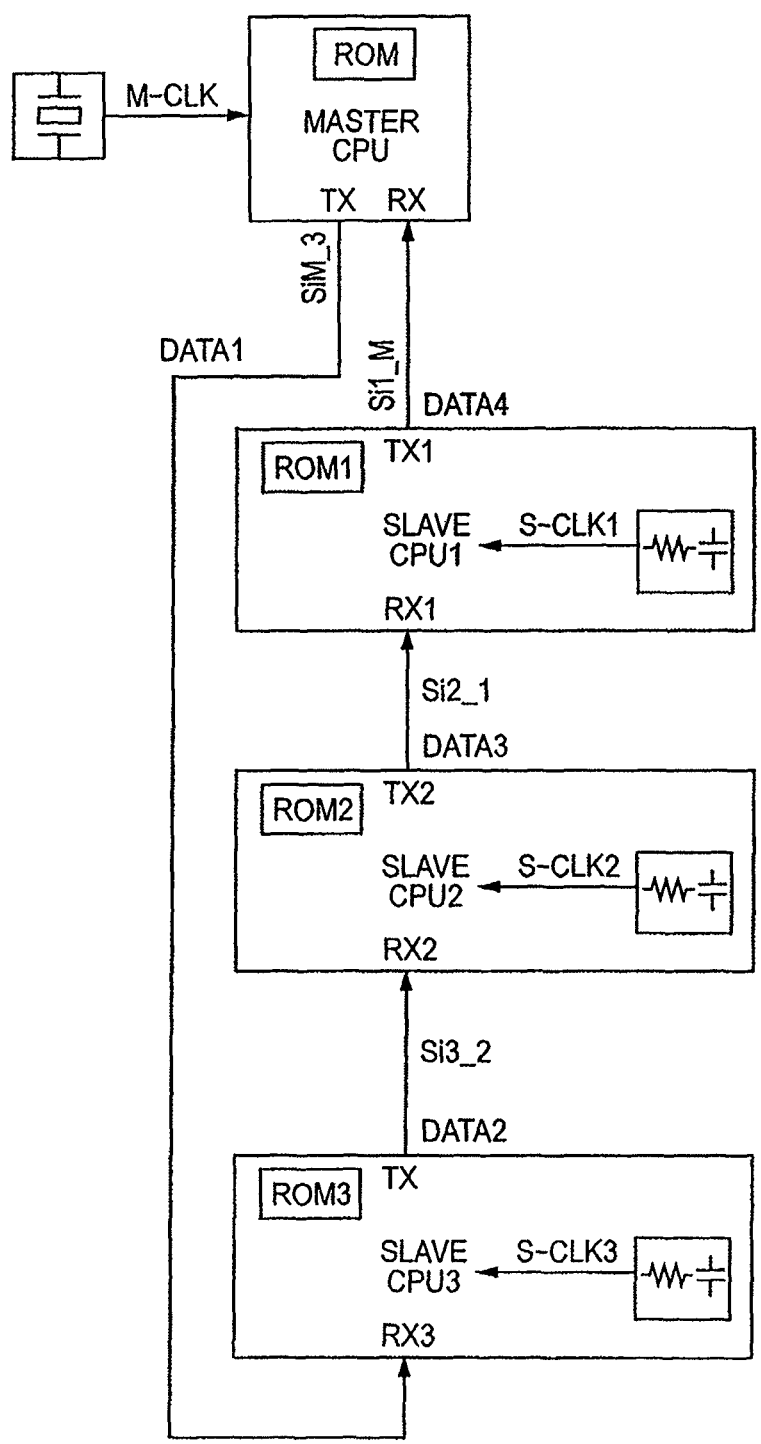
FIG. 12 is a diagram for illustrating a transmission state between the master CPU and the slave CPU.

FIG. 12 is a diagram of a configuration and a timing chart for illustrating a transmission state between the master CPU and the slave CPU. In FIG. 12, the master CPU and the slave CPUs 1 to 3 are cascadingly connected to each other. The master CPU transmits a signal of SiM-3 to the slave CPU 3. The slave CPU 3 transmits a signal of Si3-2 to the slave CPU 2. The slave CPU 2 transmits a signal of Si2-1 to the slave CPU 1. The slave CPU transmits a signal of Si1-M to the master CPU.

The slave CPU 3 acquires a transmission data data1 from SiM-3 received from the master CPU, performs a prescribed process according to a program stored in a ROM 3 based on the transmission data data1, and subsequently transmits the signal Si3-2 to the slave CPU 2 at the immediately upper stage.

The slave CPU 2 acquires a transmission data data2 from Si3-2 received from the slave CPU 3, performs a prescribed process according to a program stored in a ROM 2 based on the transmission data data2, and subsequently transmits the signal Si2-1 to the slave CPU 4 at the immediately upper stage.

The slave CPU 1 acquires a transmission data data3 from Si2-1 received from the slave CPU 2, performs a prescribed process according to a program stored in a ROM 1 based on the transmission data data3, and subsequently transmits the signal Si1-M to the master CPU. The prescribed process may be, for example, a sheet transporting operation by the sheet supply section.

Figure 13:
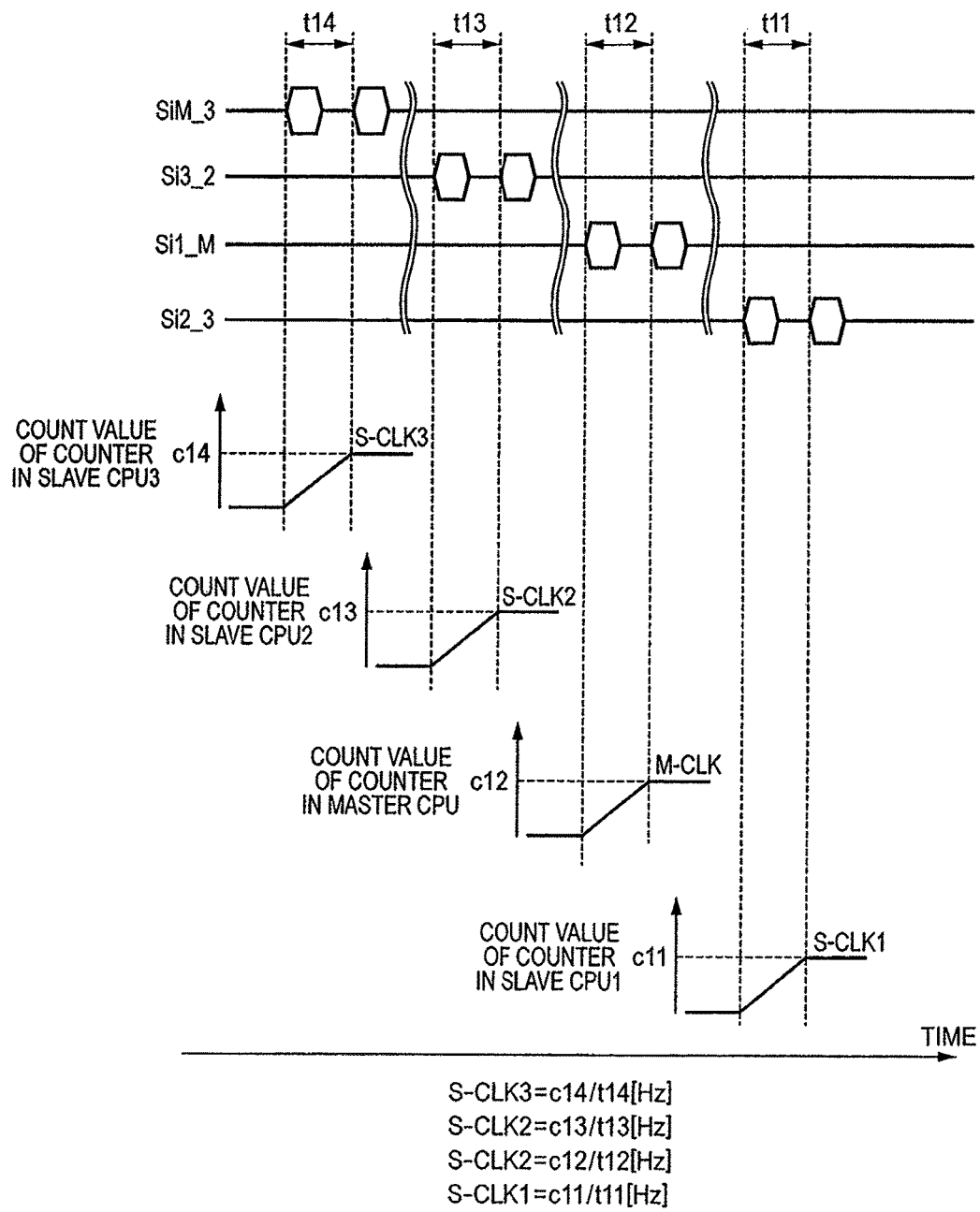
FIG. 13 is a timing chart for illustrating the transmission state between the master CPU and the slave CPU.

In FIG. 13, the clock frequency S-CLK3 and the clock frequency S-CLK2 are calculated based on the predetermined time transmitted from the upstream side (master CPU). The clock frequency S-CLK2 and the clock frequency S-CLK1 are calculated based on the predetermined time transmitted from the downstream side (slave CPU).

In the process based on the predetermined time from the upstream side (master CPU), the slave CPU 3 counts a predetermined time t14 formed based on the clock frequency M-CLK of the master CPU, by the clock frequency in the slave CPU 3, thereby acquiring a count value of counter c14. The count value of counter c14 is divided by the predetermined time t14, thereby calculating the clock frequency S-CLK3. The slave CPU 2 counts a predetermined time t13 formed based on the clock frequency S-CLK3 of the slave CPU 3, by the clock frequency in the slave CPU 2, thereby acquiring a count value of counter c13. The count value of counter c13 is divided by the predetermined time t13, thereby calculating the clock frequency S-CLK2.

On the other hand, in the process based on the predetermined time from the downstream side (slave CPU), the master CPU counts a predetermined time t12 formed based on the clock frequency S-CLK1 of the slave CPU 1, by the clock frequency in the master CPU, thereby acquiring a count value of counter c12. The count value of counter c12 is divided by the predetermined time t12, thereby calculating the clock frequency S-CLK2.

The slave CPU 1 counts a predetermined time t11 formed based on the clock frequency S-CLK2 of the slave CPU 2, by the clock frequency in the slave CPU 1, thereby acquiring a count value of counter c11. The count value of counter c11 is divided by the predetermined time t11, thereby calculating the clock frequency S-CLK1.

The calculating processes from the upstream and downstream sides calculate two clock frequencies S-CLK2 for the slave CPU 2. Each of the two clock frequencies S-CLK2 is calculated based on estimated values. Thus, the accuracy is improved by assigning weights to the two clock frequencies S-CLK2 and adds the weighted clock frequencies to each other. Here, an averaging operation, which is division of the added value by two, is performed as the process of assigning the weights and addition.

Figure 14:
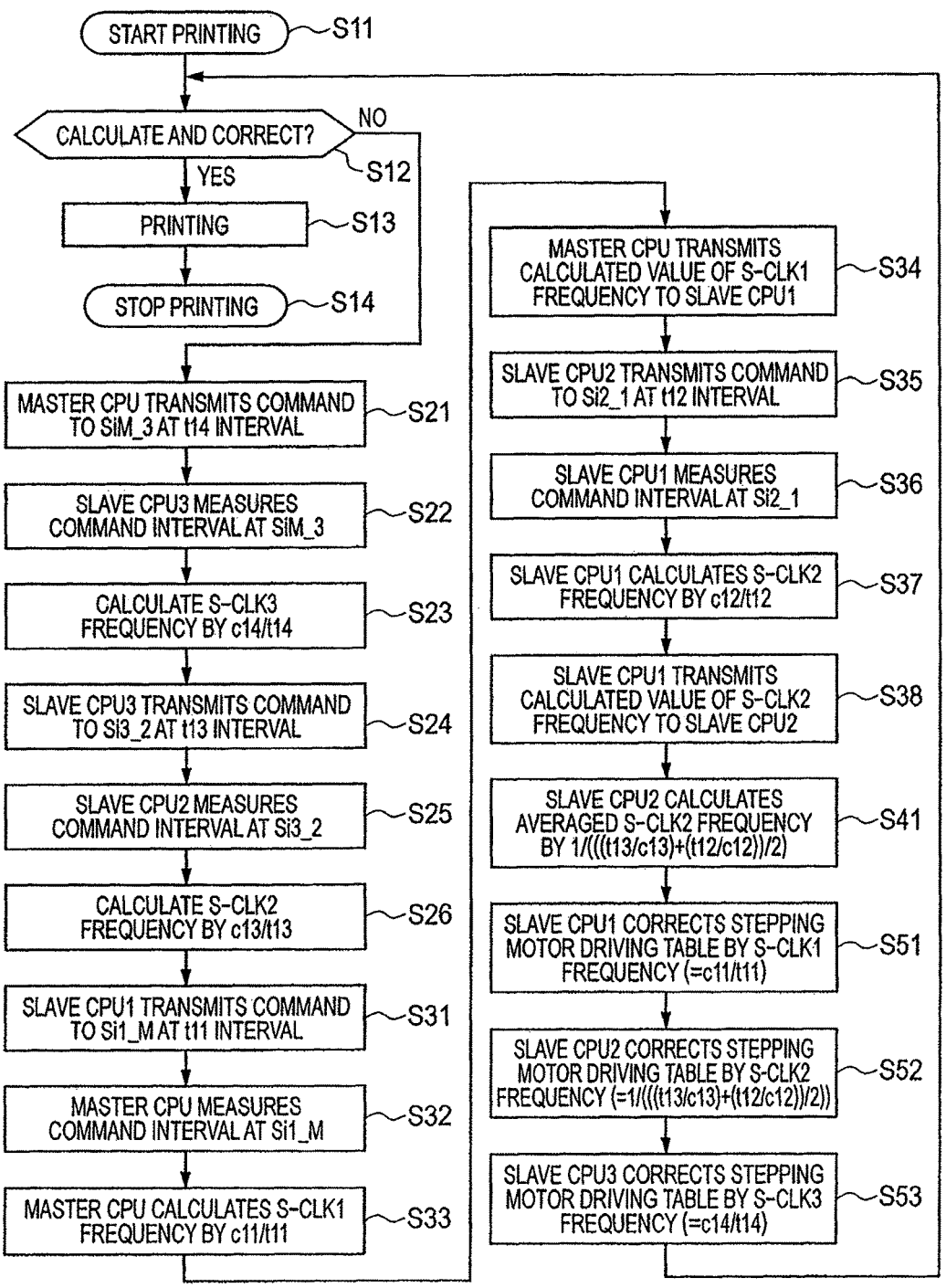
FIG. 14 is a flowchart for illustrating an operation of calculating a clock frequency (period) of the present invention.
Figure 15A:
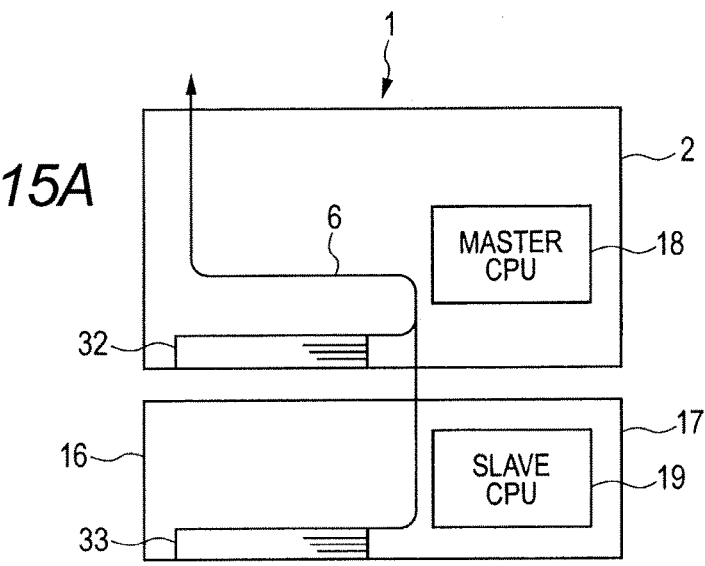
FIGS. 15A and 15B are diagrams for illustrating schematic configurations of conventional laser beam printers.
Figure 15B:
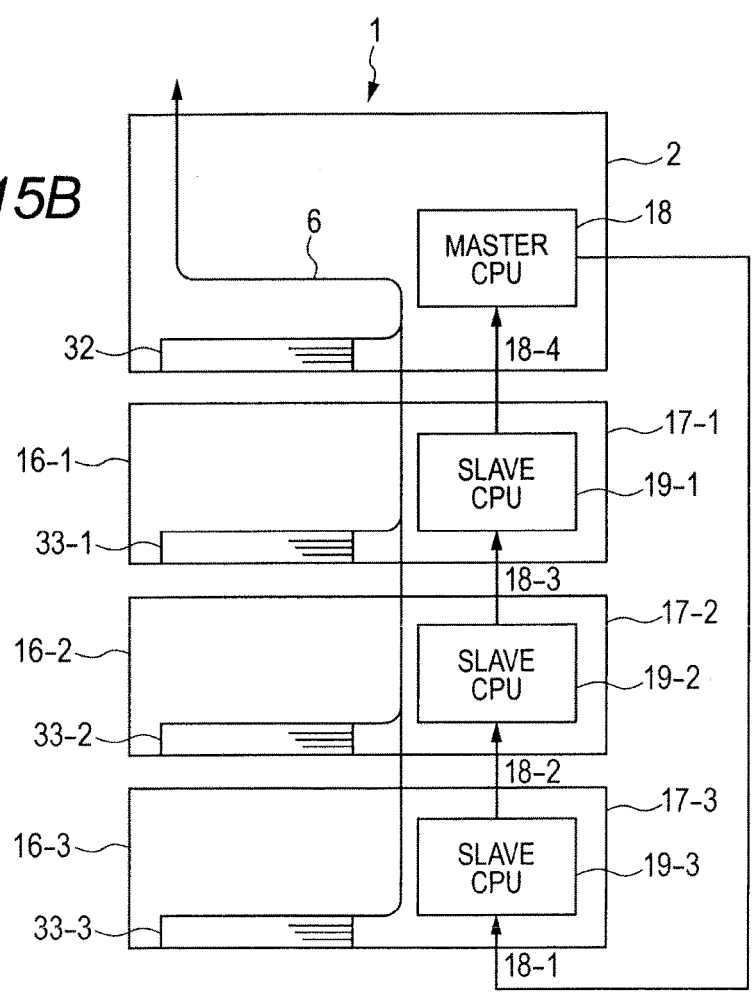
Figure 16:
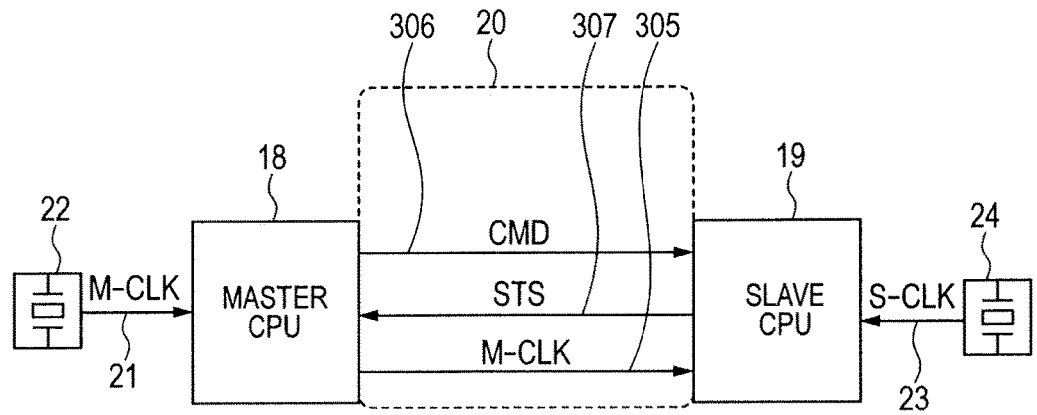
FIG. 16 is a schematic connection diagram for schematically illustrating communication between the master CPU 18 and the slave CPU 19.

FIG. 14 illustrates a flowchart when a clock calculation is performed in a case of a multistage configuration illustrated in FIG. 12.

In the flowchart of FIG. 14, after a printing operation by the image forming apparatus is started (S11), operations S21 to S53 calculates and corrects the clock frequency (period) of the slave CPU before each printing operation (S12). Here, the example of calculating the clock frequency (period) of the slave CPU for each printing operation is described. However, the calculating operation is not limited to the case of performing for each printing operation. Instead, the calculating operation may be performed at a prescribed time interval, including a case of calculation when the power of the image forming apparatus is turned on.

In the operations S21 to S53, S21 to S26 are processes of calculating the clock frequency based on the predetermined time from upstream (master). S31 to S38 are processes of calculating the clock frequency based on the predetermined time from downstream (slave). S41 is a process of calculating the clock frequency by assigning weights. S51 to S53 are processes of correcting the driving table of stepping motor based on the calculated clock frequency.

In the processes S21 to S26, first, the master CPU transmits a command signal at the time interval t14 to SiM-3 (S21). The slave CPU 3 counts the command interval t14 on the command signal transmitted to SiM-3, by the clock frequency S-CLK3, thereby acquiring the count value of counter c14 (S22). The clock frequency S-CLK3 (=c14/t14) is calculated and estimated from the count value of counter c14 and the time interval t14 (S23).

Next, the slave CPU 3 forms the time interval t13 based on the calculated clock frequency S-CLK3 (=c14/t14), and transmits the command signal at the time interval t13 to Si3-2 (S24). The slave CPU 2 counts the command interval t13 on the command signal transmitted to Si3-2, by the clock frequency S-CLK2, thereby acquiring the count value of counter c13 (S25). The clock frequency S-CLK2 (=c13/t13) is calculated and estimated from the count value of counter c13 and the time interval t13 (S26).

Next, in the operations S31 to S38, slave CPU 1 transmits a command signal at the time interval t11 to Si1-M (S31). The master CPU counts the command interval t11 on the command signal transmitted to Si1-M, by the clock frequency M-CLK, thereby acquiring the count value of counter c11 (S32). The clock frequency S-CLK1 (=c11/t11) is calculated and estimated from the count value of counter c11 and the time interval t11 (S33). The master CPU transmits the calculated clock frequency S-CLK1 (=c11/t11) to the slave CPU 1 (S34).

Next, the slave CPU 2 transmits the command signal at the time interval t12 to Si2-1 (S35). The slave CPU 1 counts the command interval t12 on the command signal transmitted to Si2-1, by the clock frequency S-CLK1, thereby acquiring the count value of counter c12 (S36). The clock frequency S-CLK2 (=c12/t12) is calculated and estimated from the count value of counter c12 and the time interval t12 (S37). The slave CPU 1 transmits the calculated clock frequency S-CLK2 (=t12/c12) to the slave CPU 2 (S38).

Accordingly, the slave CPU 2 acquires two values of the clock period S-CLK2, which are the clock frequency S-CLK2 (=c13/t13) calculated in the process in S26 and the clock frequency S-CLK2 (=c12/t12) calculated in the process in S37. The process of assigning weights to the two values of the clock frequency S-CLK2 acquires the clock frequency S-CLK2. Here, the clock frequency S-CLK2 (=1/(((t13/c13)+(t12/c12))/2)) is calculated by the averaging operation (S41).

Next, the driving table of the stepping motor is corrected by the clock frequency S-CLK1 (=c11/t11) calculated in S33 (S51). The driving table of the stepping motor is corrected by the clock frequency S-CLK2 (=1/(((t13/c13)+(t12/c12))/2)) calculated in S41 (S52). The driving table of the stepping motor is corrected by the clock frequency S-CLK3(=c14/t14) calculated in S23 (S53).

In the embodiments of the present invention, it is described that the master CPU is a CPU for image forming control and, on the other hand, the slave CPU controls sheet transportation. However, the slave CPU may perform a control different from the sheet transportation operation. For example, the slave CPU may perform one of LED blinking control on a display section and switching control of a power transformer of a high voltage unit.

The present invention can be applied to an image forming apparatus that includes a master CPU mainly performing image forming control and a slave CPU performing sheet transportation control wherein accuracies of oscillation circuits driving the respective CPUs are different. The image forming apparatus may include not only a printer but also a copier and a facsimile machine.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2009-293504, filed Dec. 24, 2009, and No. 2010-278281, filed Dec. 14, 2010 which are hereby incorporated by reference herein in their entirety.

What is claimed is:

1. An image forming apparatus comprising:
a first CPU;
a second CPU configured to perform a prescribed control in accordance with a timing based on a target counter value, the target counter value based on counts of a clock signal of an oscillation circuit of the second CPU;
a counting unit configured to count a number of clock signals of the oscillation circuit of the second CPU, relative to a clock signal of an oscillation circuit of the first CPU; and
an adjustment unit configured to change the target counter value without changing a clock frequency of the oscillation circuit of the second CPU, based on the count by the counting unit.

2. The image forming apparatus according to claim 1, wherein an oscillation accuracy of the oscillation circuit of the second CPU is lower than that of the oscillation circuit of the first CPU.

3. The image forming apparatus according to claim 1, wherein the adjustment unit changes the target counter value when the prescribed control is started or the image forming apparatus is turned on.

4. The image forming apparatus according to claim 1, wherein the adjustment unit changes the target counter value based on a difference between the measured counter value counted by the first CPU and a measured counter value counted by the second CPU.

5. An image forming apparatus comprising:
a first CPU configured to perform an image forming control and a sheet transportation control;
a second CPU configured to perform a sheet transportation operation on an upstream side of the apparatus in comparison with the sheet transportation controlled by the first CPU, the operation being performed based on data from the first CPU,
wherein each of the first CPU and the second CPU comprises an oscillation circuit generating a clock signal as a basis of operation of the respective CPU,
wherein communication data is received and transmitted between the first CPU and the second CPU by serial communication for a predetermined time,
wherein one of the second CPU and the first CPU counts the predetermined time of the serial communication by the clock signal of the oscillation circuit of each CPU,
wherein the clock frequency of the oscillation circuit of the second CPU is calculated from the predetermined time and a measured counter value is acquired by the counting,
wherein the calculated clock frequency of the oscillation circuit of the second CPU and one of a clock frequency and a clock period predetermined at the second CPU are compared with each other, and a variation in the clock frequency or the clock period of the oscillation circuit of the second CPU is detected from a difference between both of the clock frequencies or clock periods of the oscillation circuits of the second CPU and the first CPU, and
wherein a correction process is performed such that the sheet transportation operation by the second CPU is performed according to the clock frequency predetermined at the second CPU, based on the detected variation in the clock frequency of the oscillation circuit of the second CPU.

6. The image forming apparatus according to claim 5, wherein the predetermined time is a transmission interval between the communication data in the communication,
wherein the first CPU performs the serial communication to the second CPU at the transmission interval of the predetermined time, and
wherein the second CPU counts the transmission interval by the clock signal of the oscillation circuit of the second CPU, and calculates the clock frequency of the oscillation circuit of the second CPU from the predetermined time and the measured counter value acquired by the counting.

7. The image forming apparatus according to claim 5, wherein the predetermined time is a data transmission time of the communication data,
wherein the first CPU performs the communication of the communication data for the data transmission time of the predetermined time to the second CPU, and
wherein the second CPU counts the data transmission time of the communication data by the clock signal of the oscillation circuit of the second CPU, and calculates the clock frequency of the oscillation circuit of the second CPU from the predetermined time and the measured counter value acquired by the counting.

8. The image forming apparatus according to claim 5, further comprising an image forming section and plural stages of sheet transportation sections,
wherein the image forming section and the plural stages of the sheet transportation sections are serially connectable to each other, and the sheet transportation sections include respective second CPUs,
wherein the first CPU and each second CPU are connected in a cascade connection, and the communication is performed over the cascade connection in which the first CPU is upstream of each respective second CPU, which are downstream of the first CPU,
wherein one of the downstream second CPUs, in counting the predetermined time, acquires the predetermined time based on the data length of the communication data from one of the upstream first CPU and another of the downstream second CPUs connected thereto and/or a time interval between the communication data, and counts the acquired predetermined time by the clock signal of the oscillation circuit of the one of the downstream second CPUs, and
wherein the clock frequency of the oscillation circuit of the one of the downstream second CPUs is calculated from the predetermined time and the measured counter value acquired by the counting.

9. The image forming apparatus according to claim 5, further comprising an image forming section and plural stages of sheet transportation sections,
wherein the image forming section and the plural stages of the sheet transportation sections are serially connectable to each other, and the sheet transportation sections include respective second CPUs,
wherein the first CPU and each second CPU are connected in a cascade connection, and the communication is performed in the cascade connection in which the first CPU is upstream of each respective second CPU, which are downstream of the first CPU, and one of the second CPUs is an upstream second CPU upstream of at least another second CPU,
wherein one of the upstream second CPU and the first CPU, in counting of the predetermined time, acquires the predetermined time based on the data length of the communication data from the first CPU connected to the upstream second CPU and/or a time interval between the communication data, and counts the acquired predetermined time by one of the clock signal of the oscillation circuit of the upstream second CPU and the clock signal of the oscillation circuit of the first CPU, and
wherein the clock frequency of the oscillation circuit of the upstream second CPU is calculated from the predetermined time and the measured counter value acquired by the counting.

10. The image forming apparatus according to claim 5, further comprising an image forming section and plural stages of sheet transportation sections,
wherein the image forming section and the plural stages of the sheet transportation sections are serially connectable to each other, and the sheet transportation sections include respective second CPUs,
wherein the first CPU and each second CPU are connected in a cascade connection, and the communication is performed in the cascade connection in which the first CPU is upstream of each respective second CPU, which are downstream of the first CPU,
wherein one of the downstream second CPUs, in counting of the predetermined time, acquires the predetermined time based on the data length of the communication data from one of the upstream first CPU and a second CPU connected to the one of the downstream first CPUs and/or a time interval between the communication data, and counts the acquired predetermined time by the clock signal of the oscillation circuit of the one of the downstream second CPUs, and one of the clock frequency and clock period of the oscillation circuit of the one of the downstream second CPUs is calculated as a first clock frequency from the predetermined time and the measured counter value acquired by the counting, wherein one of the second CPUs is an upstream second CPU upstream of the one of the downstream second CPUs, wherein the upstream second CPU, in counting of the predetermined time, acquires the predetermined time based on the data length of the communication data from the upstream first CPU connected to the upstream second CPU and/or a time interval between the communication data, and counts the acquired predetermined time by the clock signal of the oscillation circuit of the upstream second CPU, and the clock frequency of the oscillation circuit of the upstream second CPU is calculated as a second clock frequency from the predetermined time and the measured counter value acquired by the counting, and wherein the first clock frequency and the second clock frequency are assigned with respective weights, and the clock frequency of one of the second CPUs is calculated therefrom.

11. An image forming apparatus comprising:
a first CPU configured to control transporting of a sheet;
a second CPU configured to perform a control of transporting of the sheet in accordance with a timing based on a target counter value, the target counter value based on counts of a clock signal of an oscillation circuit of the second CPU;

a counting unit configured to count a number of clock signals of the oscillation circuit of the second CPU, relative to a clock signal of an oscillation circuit of the first CPU; and an adjustment unit configured to change the target counter value without changing a clock frequency of the oscillation circuit of the second CPU, based on the count by the counting unit.

12. The image forming apparatus according to claim 11, wherein the adjustment unit performs the detection of the difference between the clock signal of the first CPU and that of the second CPU via a communication unit connected to the adjustment unit for a communication.

13. The image forming apparatus according to claim 12, wherein the second CPU receives data for the sheet transportation control from the first CPU via the communication unit in advance.

14. The image forming apparatus according to claim 13, wherein the second CPU performs the sheet transportation control based on the data for the sheet transportation control received from the first CPU and the clock signal of the second CPU.

15. The image forming apparatus according to claim 11, wherein an oscillation accuracy of the oscillation circuit of the second CPU is lower than that of the oscillation circuit of the first CPU.

16. The image forming apparatus according to claim 11, wherein the adjustment unit changes the target counter value when the transportation of the sheet is started or the image forming apparatus is turned on.

17. The image forming apparatus according to claim 11, wherein the adjustment unit changes the target counter value based on a difference between the measured counter value counted by the first CPU and a measured counter value counted by the second CPU.

* * * * *